(12) United States Patent
Murison

(10) Patent No.: US 10,722,426 B2
(45) Date of Patent: Jul. 28, 2020

(54) REMOTE DRIVE AND WEARABLE ADULT DEVICES

(71) Applicant: Bruce Murison, North Gower (CA)

(72) Inventor: Bruce Murison, North Gower (CA)

( * ) Notice: Subject to any disclaimer, the term of this patent is extended or adjusted under 35 U.S.C. 154(b) by 119 days.

(21) Appl. No.: 15/764,201

(22) PCT Filed: Sep. 29, 2016

(86) PCT No.: PCT/CA2016/000243
§ 371 (c)(1),
(2) Date: Mar. 28, 2018

(87) PCT Pub. No.: WO2017/054072
PCT Pub. Date: Apr. 6, 2017

(65) Prior Publication Data
US 2018/0289585 A1    Oct. 11, 2018

Related U.S. Application Data

(60) Provisional application No. 62/234,193, filed on Sep. 29, 2015.

(51) Int. Cl.
*A61F 5/00* (2006.01)
*A61H 23/02* (2006.01)
(Continued)

(52) U.S. Cl.
CPC ......... *A61H 23/0263* (2013.01); *A61H 19/32* (2013.01); *A61H 19/34* (2013.01);
(Continued)

(58) Field of Classification Search
CPC .... A61H 23/0263; A61H 19/32; A61H 19/34; A61H 19/44; A61H 21/00
(Continued)

(56) References Cited

U.S. PATENT DOCUMENTS

| 3,735,757 A | 5/1973 | MacFarland |
| 8,647,255 B2 * | 2/2014 | Levy .................... A61F 5/41 |
| | | 600/38 |

(Continued)

FOREIGN PATENT DOCUMENTS

| EP | 2644175 A1 | 10/2013 |
| EP | 2974710 A2 | 1/2016 |

(Continued)

*Primary Examiner* — John P Lacyk
(74) *Attorney, Agent, or Firm* — Rosenberg, Klein & Lee

(57) ABSTRACT

The majority of adult devices have been designed for an individual to hold. However, it would be beneficial to provide users with a range of adult devices that support their use either in a hands free manner and/or are compatible with being worn by the user for varying periods of time from intermittent/occasional short durations through to extended wearing such as all day for example. In order to provide such wearable devices being able to separate the drive means from the stimulation means provides increased design flexibility as well as allowing different designs of adult device to be implemented as the design flexibility within the appropriate regions of the user's anatomy increases when the large vibratory motors are removed and connected to the stimulation means via flexible drive shaft. Further, beneficially, flexible drive shafts allow operation as the user moves during normal activities, such as sitting, standing, walking, etc.

19 Claims, 20 Drawing Sheets

(51) Int. Cl.
*A61H 19/00* (2006.01)
*A61H 21/00* (2006.01)
*H02K 7/00* (2006.01)
*H02K 7/06* (2006.01)

(52) U.S. Cl.
CPC ............. *A61H 19/44* (2013.01); *A61H 21/00* (2013.01); *H02K 7/003* (2013.01); *H02K 7/063* (2013.01); *A61H 2023/029* (2013.01); *A61H 2023/0281* (2013.01); *A61H 2201/0153* (2013.01); *A61H 2201/0165* (2013.01); *A61H 2201/0169* (2013.01); *A61H 2201/0192* (2013.01); *A61H 2201/1207* (2013.01); *A61H 2201/1223* (2013.01); *A61H 2201/1463* (2013.01); *A61H 2201/165* (2013.01); *A61H 2201/169* (2013.01); *A61H 2201/1635* (2013.01); *A61H 2201/1638* (2013.01); *A61H 2201/1645* (2013.01); *A61H 2201/1652* (2013.01); *A61H 2201/1666* (2013.01); *A61H 2201/1695* (2013.01); *A61H 2201/501* (2013.01); *A61H 2201/5002* (2013.01); *A61H 2201/5005* (2013.01); *A61H 2201/5012* (2013.01); *A61H 2201/5097* (2013.01)

(58) Field of Classification Search
USPC ..................................................... 600/38–41
See application file for complete search history.

(56) References Cited

U.S. PATENT DOCUMENTS

| | | | |
|---|---|---|---|
| 2011/0034763 | A1 | 2/2011 | Domnick et al. |
| 2014/0336452 | A1* | 11/2014 | Shahoian ............... A61H 19/30 600/38 |
| 2014/0357944 | A1 | 12/2014 | Spietz |

FOREIGN PATENT DOCUMENTS

| | | | |
|---|---|---|---|
| JP | 2013-39318 A | | 2/2013 |
| JP | 201339318 | * | 2/2013 |
| KR | 2003-0000165 A | | 1/2003 |
| WO | 2014/043263 A1 | | 3/2014 |

* cited by examiner

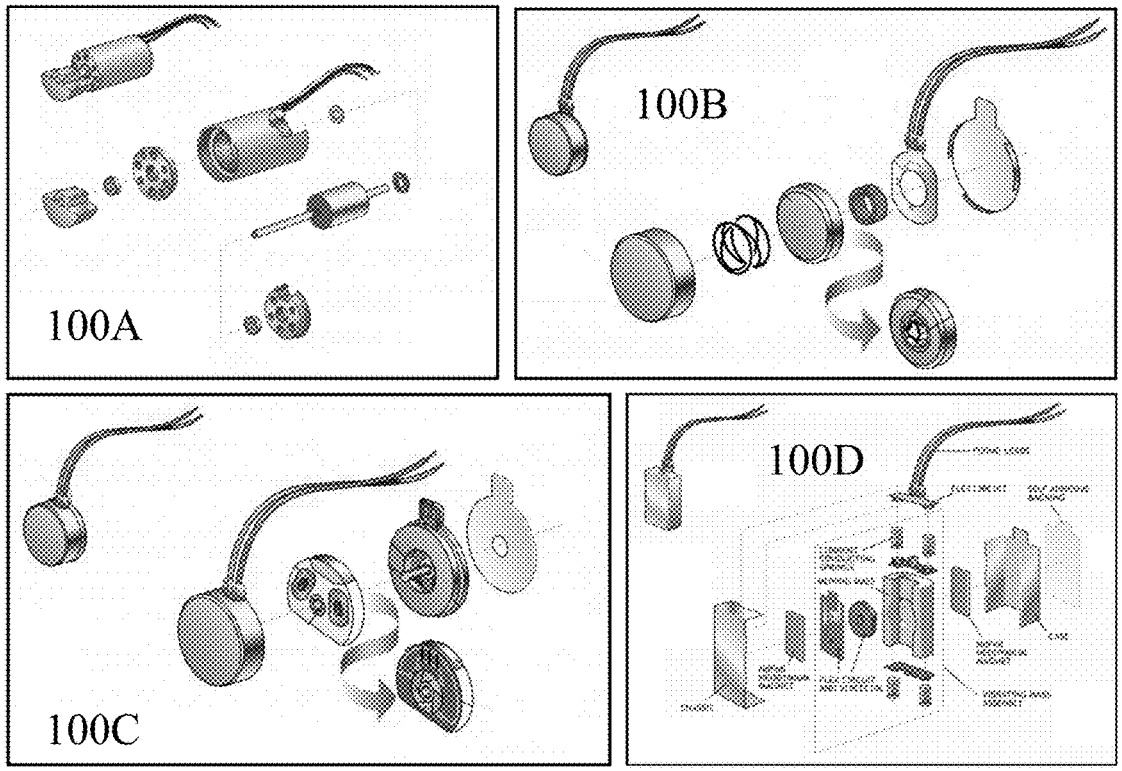
Figure 1  PRIOR ART
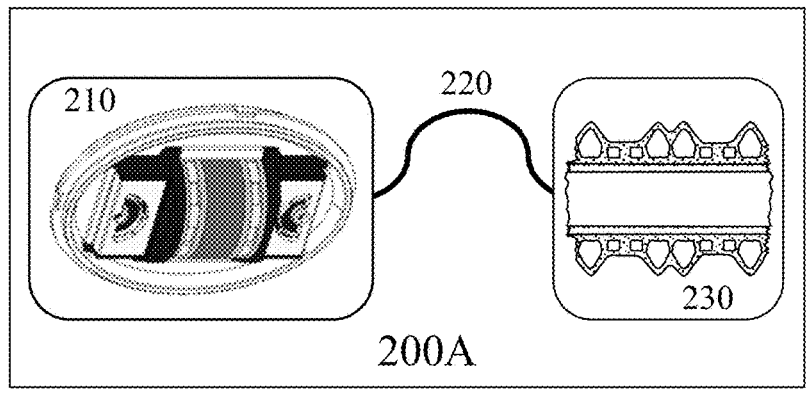
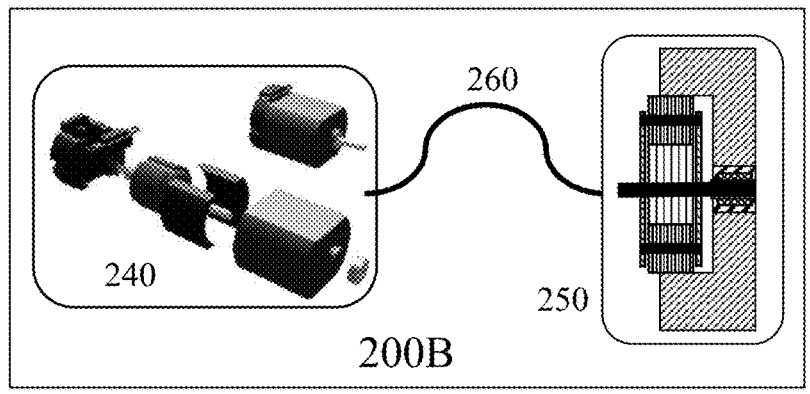
Figure 2

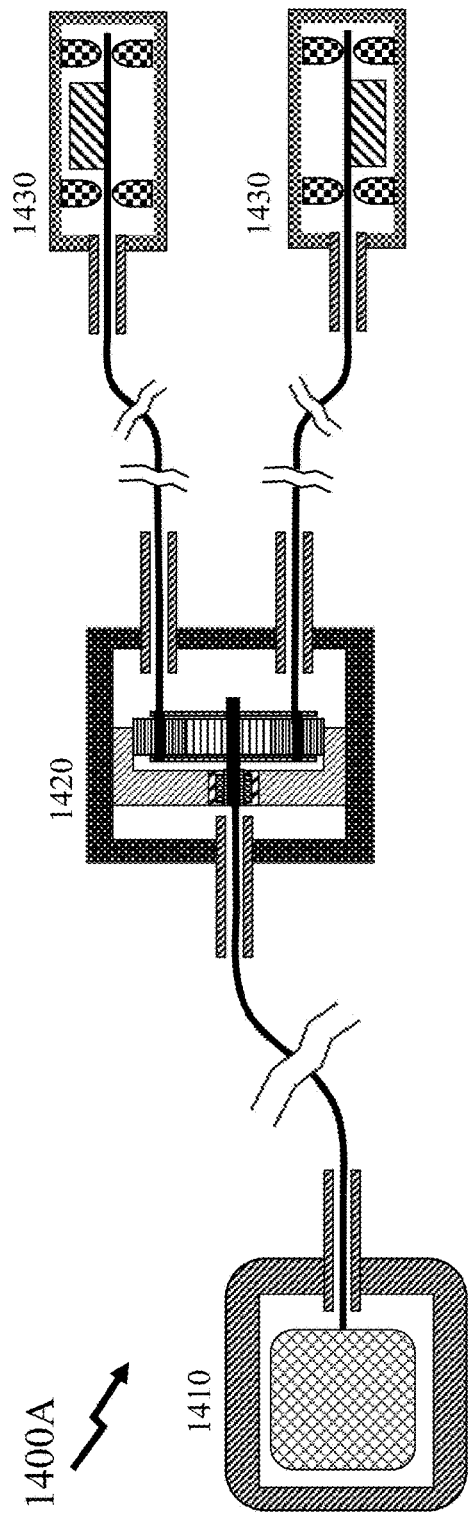
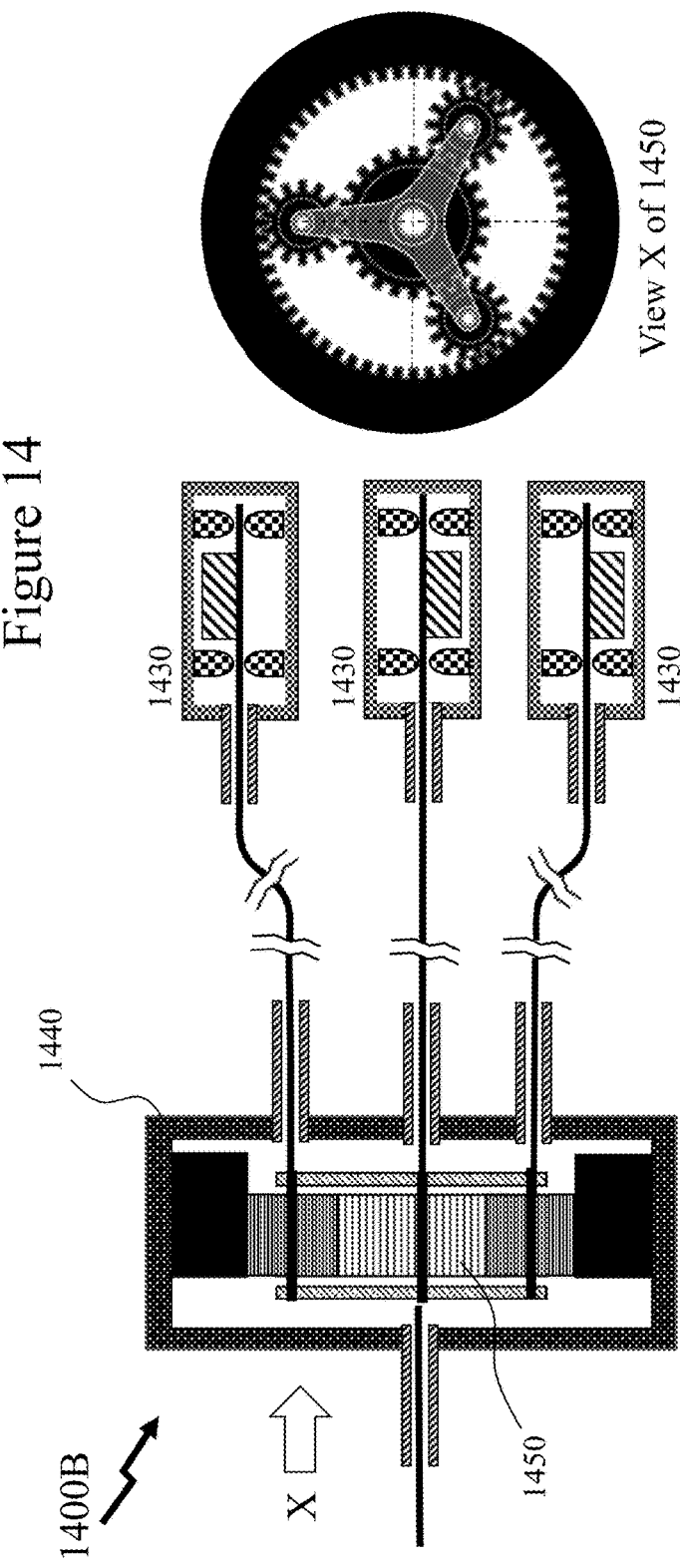
Figure 14

REMOTE DRIVE AND WEARABLE ADULT DEVICES

CROSS REFERENCE TO RELATED APPLICATIONS

This application claims the benefit of priority as a 371 National Phase Application of PCT/CA2016/000,243 filed Sep. 29, 2016 entitled "Remote Drive and Wearable Adult Devices" which itself claims priority from U.S. Provisional Patent Application 62/234,193 filed Sep. 29, 2015 entitled "Remote Drive and Wearable Adult Devices", the entire of contents of each being incorporated herein by reference.

FIELD OF THE INVENTION

This invention relates to adult devices and more particularly to the provisioning of adult devices wherein the motive means and mechanical actuators are provided in a manner allowing insertion of a part of the human body such that the adult device is wearable.

BACKGROUND OF THE INVENTION

A sex toy or adult device is an object or device that is primarily used to facilitate human sexual pleasure which are typically designed to resemble human genitals and may be mechanized and non-mechanized. Mechanized adult devices typically vibrate, although there are examples that rotate, thrust, and even circulate small beads within an elastomeric shell. Non-mechanized adult devices are made from a solid mass of rigid or semi-rigid material in a variety of shapes. Accordingly, today, a wide range of adult devices are offered commercially to users with the majority of them falling into several broad categories including clitoral, (G-spot), dildo, rabbit (generally comprising two vibrators, one phallus-like shaped intended for insertion and a second smaller clitoral stimulator), egg (small smooth vibrators for external or internal stimulation although now offered in a range of shapes), anal, penis ring, bullet (small cylindrical vibrators), c-shaped (for generally hands free use by insertion into the vagina with one or two vibrators for clitoral and/or g-spot stimulation including variants for use during penile penetration) and Butterfly (generally a vibrator with straps). Further, for men there are adult devices with a range of vibrations and movements associated with the penis. All of these are generally "hand-held" devices although in some instances these are employed as part of saddles etc. for use by one or more people at time without manual manipulation, holding, retention etc.

In addition to the above general categories there are adult device variants including, but not limited to, dual vibrators (designed to stimulate two erogenous zones simultaneously or independently), triple vibrators (designed to stimulate three erogenous zones simultaneously or independently), double-ended (for vaginal-vaginal, vaginal-anal, or anal-anal stimulation); nipple stimulators, and electrostimulators. Some other devices such as Kegel balls or Ben-Wa balls which are ostensibly aimed at vaginal muscle exercises etc. can include vibrating elements and are also generally categorized under adult devices.

However, the majority of prior art devices are designed and intended for the individual to hold in order to stimulate the female clitoris or for the other individual to hold against the individual's clitoris and do not allow for "hands-free" operation. Amongst the exceptions to this are large mechanical "machines", cock-rings and C-shaped devices, the latter providing for hands-free stimulation of the individual's clitoris, g-spot and optionally concurrent penetration.

Accordingly, it would be beneficial to provide users with a range of adult devices that support use in a hands free manner and/or are compatible with being worn by the user for varying periods of time from intermittent/occasional short durations through to extended wearing such as all day for example. In order to provide such wearable devices, it is therefore extremely beneficial to be able to separate the drive means from the stimulation means such that increased design flexibility is provided as well as allowing different designs of ADDEV to be implemented as the design flexibility within the appropriate regions of the user's anatomy increases when the large vibratory motors are removed and connected to the stimulation means via flexible drive shaft. Further, beneficially, flexible drive shafts allow operation as the user moves during normal activities, such as sitting, standing, walking, etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to adult devices and more particularly to the provisioning of adult devices wherein the motive means and mechanical actuators are separated and/or the adult device is wearable.

In accordance with an embodiment of the invention there is provided a device for sexual stimulation comprising a motor, a vibratory actuator, and a flexible drive shaft connected to an output of the motor and providing motive power to the vibratory actuator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts prior art vibratory elements wherein the vibrator portion and motive means are housed within the same housing and directly mechanically coupled;

FIG. 2 depicts vibratory elements wherein the vibrator portion and motive means may be physically separated in different housings but are coupled by a drive means such as fluidic coupling or flexible drive;

FIG. 14 depicts ADDEVs exploiting flexible drive train interconnections between vibratory element and a motive means with intermediary gear reduction/fanout according to embodiments of the invention;

DETAILED DESCRIPTION

Figure 3:
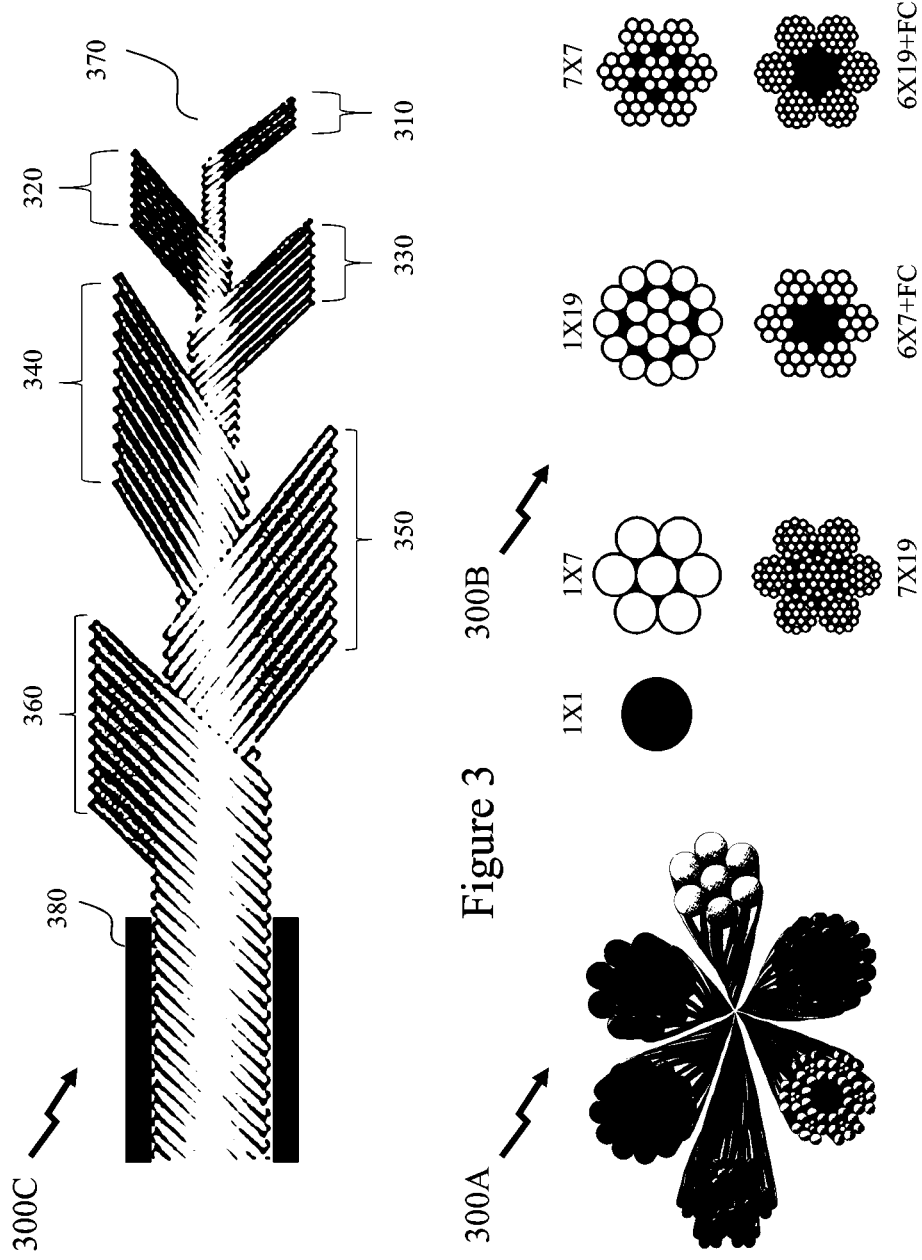
FIG. 3 depicts examples of flexible drive cabling designs according to embodiments of the invention.

The present invention is directed to adult devices and more particularly to the provisioning of adult devices wherein the motive means and mechanical actuators are separated and/or the adult device is wearable.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors. The wearable devices and/or wearable sensors may include, but not be limited to, devices that can stimulate and/or measure parameters that are designed to fit on or near the perineum, anal area, vagina, clitoral area, and nipples.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited to, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

An "adult device", "sexual pleasure device", or "sex toy" as used herein, and throughout this disclosure, refers to a sexual pleasure device intended for use by an individual or user themselves or in conjunction with activities with another individual or user which can provide one or more functions including, but not limited to, those of a dildo and a vibrator. The adult device can be designed to have these functions in combination with design features that are intended to be penetrative or non-penetrative, provide vibratory and non-vibratory mechanical functions, or be passive. Such adult devices can be designed for use with one or more regions of the male and female bodies including but not limited to, the clitoris, the clitoral area (which is the area surrounding and including the clitoris), vagina, rectum, nipples, breasts, penis, testicles, prostate, and "G-spot." In one example a "male adult device" is an adult device configured to receive a user's penis within a cavity or recess. In another example, a "female adult device" is an adult device having at least a portion configured to be inserted in a user's vagina or rectum. It should be understood that the user of a female adult device can be a male or a female when it is used for insertion in a user's rectum. Such adult devices may employ one or more actuation mechanisms when providing vibratory and non-vibratory mechanical functions including, but not limited to, motors, motors with off-axis weights, linear motors, screw drives, fluidic pumps, fluidic actuators, and piezoelectric elements.

An "accessory" or "accessories" as used herein, and throughout this disclosure, refers to one or more objects that can be affixed to or otherwise appended to the body of a sexual pleasure device in order to enhance and/or adjust the sensation(s) provided. Such accessories can be passive, such as nubbies, fronds, fingers, finger, dildo, etc. or they may be active, such as a vibrator(s), electrode(s), hydraulically actuated structures, etc.

A "profile" as used herein, and throughout this disclosure, refers to a computer and/or microprocessor readable data file comprising data relating to settings and/or limits of an adult device. Such profiles may be established by a manufacturer of the adult device or established by an individual through a user interface to the adult device or a portable electronic device (PED)/fixed electronic device (FED) in communication with the adult device.

A "vibrator" as used herein, and throughout this disclosure, refers to an electronic sexual pleasure device intended for use by an individual or user themselves or in conjunction with activities with another individual or user wherein the vibrator provides a vibratory mechanical function for stimulating nerves or triggering physical sensations.

A "dildo" as used herein, and throughout this disclosure, refers to a sexual pleasure device intended for use by an individual or user themselves or in conjunction with activities with another individual or user wherein the dildo provides non-vibratory mechanical function for stimulating nerves or triggering physical sensations.

A "nubby" or "nubbies" as used herein, and throughout this disclosure, refers to a projection or projections upon the surface of a sexual pleasure device intended to provide additional physical interaction. A nubby can be permanently part of the sexual pleasure device or it can be replaceable or interchangeable to provide additional variation to the sexual pleasure device.

A "scaffold" or "scaffolds" as used herein, and throughout this disclosure, refers to a structure that is used to hold up, interface with, or support another material or element(s). This includes, but is not limited to, such two-dimensional (2D) structures such as substrates and films, three-dimensional (3D) structures such as geometrical objects, non-geometrical objects, combinations of geometrical and non-geometrical objects, naturally occurring structural configurations, and manmade structural configurations. A scaffold may be solid, hollow, and porous or a combination thereof. A scaffold may contain recesses, pores, openings, holes, vias, and channels or a combination thereof. A scaffold may be smooth, textured, have predetermined surface profiles and/or features. A scaffold may be intended to support one or more other materials, one or more films, a multilayer film, one type of particle, multiple types of particles etc. A scaffold may include, but not be limited to, a spine of a device and/or a framework, for example, which also supports a shell and/or a casing.

A "shell" as used herein, and throughout this disclosure, refers to a structure that is used to contain and/or surround at least partially and/or fully a number of elements within adult devices according to embodiments of the invention. A shell may include, but not limited to, a part or parts that are mounted to a scaffold or scaffolds that support elements within a device according to an embodiment of the invention.

A "casing" as used herein, and throughout this disclosure, refers to a structure surrounding a scaffold and/or shell. This includes structures typically formed from an elastomer and/or silicone to provide a desired combination of physical tactile surface properties to the device it forms part of and other properties including, but not limited to, hermeticity, liquid ingress barrier, solid particulate ingress barrier, surface sheen, and colour. A casing may include, but not limited to, a part or parts that are mounted to a scaffold or scaffolds and/or a casing or casings forming part of a device according to an embodiment of the invention.

An "electric motor" or "motor" as used herein, and throughout this disclosure, refers to a category of providers of motive means characterised by a periodic movement of a shaft or drive shaft connected to the motor which is powered by electricity. Such motors include DC and AC motors. This includes, but is not limited to, brushed DC motors, permanent magnet DC motors, brushless DC motors, switched reluctance motors, universal AC-DC motors, induction motors, ironless or coreless rotor motors, pancake or axial rotor motors, stepper motors, piezoelectric motors and linear motors.

A "polyester" as used herein, and throughout this disclosure, refers to a category of polymers that contain the ester functional group in their main chain. This includes, but is not limited to polyesters which are naturally occurring chemicals as well as synthetics through step-growth polymerization, for example. Polyesters may be biodegradable or not. Polyesters may be a thermoplastic or thermoset or resins cured by hardeners. Polyesters may be aliphatic, semi-aromatic or aromatic. Polyesters may include, but not be limited to, those exploiting polyglycolide, polylactic acid (PLA), polycaprolactone (PCL), polyhydroxyalkanoate (PHA), polyhydroxybutyrate (PHB), polyethylene adipate (PEA), polybutylene succinate (PBS), polyethylene terephthalate (PET), polybutylene terephthalate (PBT), polytrimethylene terephthalate (PTT), and polyethylene naphthalate (PEN).

A "thermoplastic" or "thermosoftening plastic" as used herein and throughout this disclosure, refers to a category of polymers that become pliable or moldable above a specific temperature and solidify upon cooling. Thermoplastics may include, but not be limited, polycarbonate (PC), polyether sulfone (PES), polyether ether ketone (PEEK), polyethylene (PE), polypropylene (PP), poly vinyl chloride (PVC), polytetrafluoroethylene (PTFE), polyimide (PI), polyphenylsulfone (PPSU), polychlorotrifluoroethene (PCTFE or PTFCE), florinated ethylene propylene (FEP), and perfluoroalkoxy alkane (PFA).

A "metal" as used herein, and throughout this disclosure, refers to a material that has good electrical and thermal conductivity. Such materials may be malleable and/or fusible and/or ductile. Metals may include, but not be limited to, aluminum, nickel, copper, cobalt, chromium, silver, gold, platinum, iron, zinc, titanium, and alloys thereof such as bronze, stainless steel, stainless stainless steel, brass, and phosphor bronze.

An "aramid" as used herein, and throughout this disclosure, refers to an aromatic polyamide. Aramids are a class of materials fibers in which the chain molecules are highly oriented along the fiber axis, so the strength of the chemical bond can be exploited. Examples, include, but are not limited to fibers distributed under brand names such as Kevlar™ Technora™, Twaron™, Heracron™, Nomex™, Innegra S™ and Vectran™ as well as nylon and ultra-high molecular weight polyethylene.

A "silicone" as used herein, and throughout this disclosure, refers to a polymer that includes any inert, synthetic compound made up of repeating units of siloxane.

An "elastomeric" material or "elastomer" as used herein, and throughout this disclosure, refers to a material, generally a polymer, with viscoelasticity. Elastomers may include, but not be limited to, unsaturated rubbers such as polyisoprene, butyl rubber, ethylene propylene rubber, silicone rubber, fluorosilicone rubber, fluoroelastomers, perfluoroelastomers, and thermoplastic elastomers.

The terms "woman" or "female" as used herein, and throughout this disclosure, refers to a human having a clitoris or clitoral region and, optionally, a vagina and/or an anus. The terms "woman" and "female" are used interchangeably herein. A female may be a user, an individual, another user, and/or another individual within contexts of the specification.

The terms "man" or "male" as used herein, and throughout this disclosure, refers to a human having a penis and, optionally, testes and/or an anus. The terms "man" and "male" are used interchangeably herein. A male may be a user, an individual, another user, and/or another individual within contexts of the specification.

The term "flexible," as used herein, refers to the ability of a body that is capable of being bent or flexed. Something that is flexible can be, for example, resilient or malleable. The term "resilient," as used herein, refers to the ability of a body that has been subjected to an external force to recover, or substantially recover, its original size and/or shape, following deformation. The term "malleable," as used herein, refers to the ability of a body that has been subjected to an external force to deform and maintain, or substantially maintain, the deformed size and/or shape. The term "flexible," as used herein, refers to the ability of a body that has been subjected to an external force to return to its original size and/or shape once the external force has been removed or reduced to below a particular level.

As used herein, the terms "sex", "intercourse", "sexual intercourse" are intended to have a meaning referring to an act or action between two users wherein part of the act or action relates to the stimulation of one user's or both user's clitoris and/or clitoral region. Such acts or actions may or may not involve the concurrent penetration of a user's vagina, anus, or mouth and may be male-female, female-female, and solitary female based acts or actions.

Referring to FIG. 1 there are depicted prior art vibratory first to fourth vibratory elements 100A to 100D wherein they comprise both the motive means and actuator within a single piece part. First to fourth options 100A to 100D respectively are not exhaustive of the options available but represent the dominant current technology, first option 100A, and technologies exploited within other products than adult devices with second to fourth vibratory elements 100B to 100D respectively. These being:

First option 100A with brushless cylinder rotary motor with an eccentric mass attached to the shaft of the rotary motor;

Second option 100B with a first linear resonant motor, strictly referred to as a Y-axis linear resonant motor, wherein a magnetic mass is actuated under action of an electrical coil;

Third option 100C with shaftless motor, commonly referred to as a pancake motor, wherein an asymmetric mass with coils rotates upon a shaft centrally disposed to a radial magnet; and Fourth option 100D with a second linear resonant motor, strictly referred to as a Z-axis linear resonant motor, wherein a magnetic mass is actuated under action of an electrical coil but now slides within a guide rail.

Accordingly, each of first to fourth vibratory elements 100A to 100D respectively is connected to a remote power source via electrical cables and within the same piece-part achieves the designed motive means and vibratory functionality. Of these the eccentric mass attached to a rotary motor shaft dominates the adult device market as it offers a wide range of operating frequency, and hence vibratory stimulation, with good efficiency, mechanical action, etc.

However, these devices for strong vibrations are typically 12-20 mm in diameter (0.5"-0.8") and 20-40 mm in length (0.8" to 1.6") such that the use of more than one or two within an adult device (ADDEV) leads to it being bulky and heavy which goes against many design goals of ADDEVs in terms of being lightweight and compact. These design goals becoming even more important when wearable devices are considered where these should, ideally, be invisible to other users under or within the clothing of the wearer (user), silent, and lightweight. Additionally, considerations of ergonomics, wearability over extended periods of time, etc. become important. Accordingly, the inventors have within World Patent Applications WO/2014/047717 entitled "Methods and Devices for Fluid Driven Adult Devices" and WO/2014/047718 entitled "Fluidic Methods and Devices" described a series of fluidic actuators and fluidic pumps that as depicted in first remote drive technology 200A in FIG. 2 allow the actuator 220 to be physically separated from the motive means (pump) 210 via the fluidic cable 230.

Also depicted in FIG. 2 in second remote drive technology 200B is rotary motor 240 coupled to an actuator 250 via drive shaft 260. Within the embodiments of the invention presented below in respect of FIGS. 5 to 21 the interconnection between the motive means and the actuator is considered as being flexible with a varying degree of flexibility or rigidity depending upon the design of the ADDEV, the intended deployment scenario or scenarios, etc. However, it would be evident that some embodiments of the invention may replace a flexible drive shaft with a rigid or semi-rigid drive shaft whilst maintaining the electric motor to remote actuator methodology. In other embodiments of the invention a fluidic system may be employed in place of the described motor—flexible drive—actuator whilst maintaining the overall design methodology of the ADDEV. In other embodiments of the invention a remote drive motive means—actuator may be replaced with a combined motive means—actuator element such as described and depicted in respect of first to fourth vibratory elements 100A to 100D in FIG. 1 whilst maintaining the overall design methodology of the ADDEV.

A mechanical flexible drive shaft is required to meet a range of mechanical design criteria even before considerations of ergonomics, aesthetics etc. Amongst the factors to consider are those listed in Table 1 below.

TABLE 1

Flexible Drive Shaft Mechanical Design Criteria

| Criteria | Description |
| --- | --- |
| Maximum Bend Radius | The maximum bend radius of the flexible shaft should ideally be as large as possible, but typically from 25 mm to 50 mm (1" to 2") in order to allow for wearable ADDEVs and motion of user. |
| Minimum Bend Radius | The minimum bend radius of the flexible shaft should ideally be as small as possible, but typically from 5 mm to 15 mm (0.20" to 0.60") in order to allow for wearable ADDEVs and motion of user. |
| Torque Capacity | Transmit a nominal power of a couple of watts, e.g. 2-5 W, at speeds of typically 2,000-7,500 revolutions per minute (RPM) over the desired life-cycle. |
| Rotation Rate | As wide as possible, but may vary from low RPM of weights in so-called "sub-sonic" operation with 350-1,500 RPM achieved for example with 3:1 to 10:1 gear reduction from 3,500-5,000 RPM motors through to direct drove at 3,500-5,000 RPM of motor, to high speed 10,000-20,000 RPM with |
| Noise | As quiet as possible, approaching inaudibility. |
| Life-Cycle | Typically, several hundred hours, e.g. 250-500 hours, of continues use, representing approximately 500-1,000 uses of 30 minutes each at nominal speed of say 5,000 RPM. |

TABLE 1-continued

Flexible Drive Shaft Mechanical Design Criteria

| Criteria | Description |
| --- | --- |
| Inertial Instability | A flexible rotating object suffers from a dynamic bending/twisting instability, where the shaft will tend to have a jump-rope effect, and eventually knot. This is exacerbated when flexibility and applied torque are increased. The effect is undesirable as it leads to premature fatigue failure, see FIG. 4 third image 400C. |
| Shaft Contact with Sheath | External Deformation of the sheath or deformation of the shaft relative to the sheath may cause contact of the rotating shaft due the added shear force applied onto the rotating shaft from friction against the stationary sheath, see FIG. 4 first and fourth images for example. |
| Wear | The rotating shaft must survive failure due to wear in operation under situations of extreme usage cases. Wear failure constitutes shaft breakage, loss of power, increased noise, loss of efficiency or a general decline of usability. |

Now referring to FIG. 3 there are depicted examples of flexible drive cabling designs according to embodiments of the invention in first to third images 300A to 300C respectively. First image 300A depicts 3D schematics of multi-strand cables according to embodiments of the invention. Some of these are depicted in second image 300A wherein a cable coding scheme is depicted of format XxY-ZZ wherein X represents the number of groups of cable elements and Y the number of cable elements within each group such that, for example, as depicted 7×7 means 7 strands of 7 cores, namely 49 cores overall within the cable. -ZZ relates to whether the center of the cable with the strands is filled -FC or not (wherein it is left blank). The strands may further be twisted, plaited, and braided with different lay. The material, diameter, and properties of the filaments within the strands is typically common but may also vary according to the design performance requirements.

Alternatively, as depicted in third image 300C in FIG. 3 there is depicted a flexible drive shaft according to an embodiment of the invention comprising a mandrel 370 upon which six layers of filaments 310 to 360 are disposed wherein each of the six layers of filaments 310 to 360 comprises a number of individual filaments, e.g. first layer of filaments 310 comprises four filaments whereas sixth layer of filaments 360 comprises 12 filaments. The material, diameter, and properties of the filaments within each of the six layers of filaments 310 to 360 may be common or vary according to the design performance requirements.

The flexible drive shaft may be formed from a variety of materials according to such design performance requirements including, but not limited to, length, maximum offset, rotational speed range, maximum torque, minimum torque, start-up torque, unidirectional or bidirectional operation, etc. Materials may include, but not be limited, a metal such as stainless steel for example, a plastic, a thermoplastic, a silicone, and an aramid such as Kevlar™. It would be evident that even for a given cable design, e.g. 7×7, that the mechanical properties of the overall cable vary not only with the material but also its dimensions. In other embodiments of the invention a combination of silicone coated stranded wires may be employed. These may be lubricated so as to reduce friction of the strands rubbing each other etc. These lubricants may include dry lubricants such as powders or powder coated wire techniques as well as liquid lubricants such as silicone oil(s).

With respect to driveshaft design then a solid flexible wire and/or stranded wire provide for flexible shafts operating in the elastic deformation region. Tensile and compressive stresses are applied by the bending of the shaft, as the shaft rotates with angular velocity co while it is bent, a point p' experiences a stress that varies sinusoidally with time, creating an effective cyclic loading condition at all points on the rotating shaft. Shear-stress due to torsion can be assumed constant, though when considering total stress, which is calculated from Equation (1) below where $\sigma_X$ is the bending stress, and $\tau_L$ is the maximum shear stress due to torsional loading. The overall time-varying stress has a positive average value, which must be taken into account in fatigue analysis.

$$\sigma_{TOTAL} = \sqrt{\sigma_X^2 + \tau_L^2} \quad (1)$$

Cyclic loaded shafts must be designed for fatigue and wear life, as well as normal failure modes, so material choice is as important as shaft diameter as a design consideration. Torque carrying capacity increases with shaft diameter but equally cyclic bending stress increases with shaft diameter, so fatigue life decreases with shaft diameter. Bending stresses are proportion to Young's modulus, E and a higher ratio of fatigue strength to Young's modulus, $E/\sigma_F$, therefore implies greater overall fatigue life for a particular material.

Referring to Table 2 there are depicted multiple material choices for flexible drive shafts including metals, plastics, and silicone. Table 2 also shows a minimum material parameter, $E/\sigma_F$, as determined for typical bend radius in wearable ADDEVs in order to gauge material suitability. Minimum and maximum shaft diameter are then determined based on the required torque capacity, and minim bend radius, respectively. As evident from Table 2 metallic flexible drive shafts offer higher load carrying capacity, having lower twist rates/length, but higher stiffness causing lower fatigue life. Many metals are not feasible due to this fact for bending radius of shafts for ADDEVs exploiting gear-reduction configurations within reasonable device footprints. The elastic nature of metals and low amount of elastic hysteresis result in very high efficiency in power transmission (basically 100%). Stranded metal wire is an ideal solution for the lower-curvature flexible drive-shaft wearable case.

Elastomers are opposite in characteristics from metals, low bending stress, but potentially very sharp bending radii, low load carrying capacity and high twist/length. They are thus ideal for cases requiring sharper bend radius. The viscoelastic nature of elastomeric and plastic materials results potentially in power loss due to the hysteresis when bending (when the material bends itself back, it provides less force than was originally applied to bend it). Plastics, particularly stiff plastics such as Delrin have lower toughness than silicone, are typically inadequate for sharp bend radius applications, and are unavailable generally as stranded wire. Plastics also exhibit power loss, though it is less than in elastomers. Typically stranded and solid wire drive-shafts may be coated with Teflon or a Teflon-like material to minimize chatter against internal bushings.

Stranded wire solutions are ideal for low-load, longer-shaft, and high-bend radius applications. Similar to the solid-wire case, a wire-chord is composed of multiple strands. Given each strands smaller diameter, stranded wires have superior bendability but are able to carry a significant torsional load (though still less than an equivalently thick solid wire). Other potential problems include unwinding the stranded wires and friction between slipping wire strands.

Figure 5:
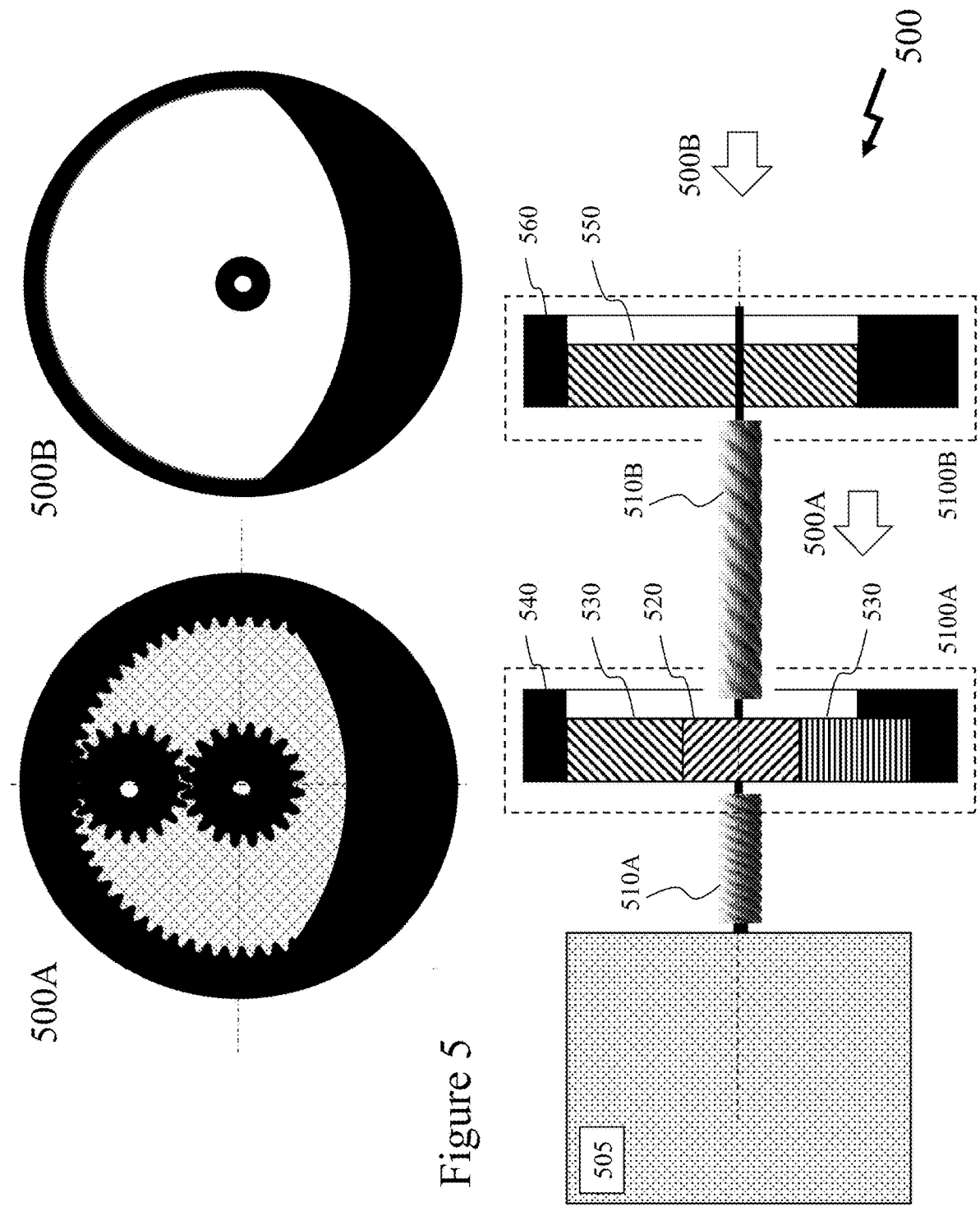
FIG. 5 depicts a high impact vibratory element providing mechanical actuations according to an embodiment of the invention.

Accordingly, it is evident from Table 2 that flexible drive shafts may be formed from a variety of materials including NiTinol. Teflon, Delrin, Nylon 66, and silicone-based elastomers.

shaft, the position of the motive means, the position of the actuator, the integration with or deployment in combination clothing and/or other items of apparel. Further these considerations may be influenced by or affected/impacted by the selection of the vibratory element(s) employed in combination with the motive means. Examples of different vibratory elements are described and depicted in respect of FIGS. 5 to 9 with varying loading/requirements for the drive provided from the motive means and flexible drive shaft. Referring to FIG. 5 there is depicted a high impact actuator providing mechanical actuations according to an embodiment of the invention and as described by the inventors within World Patent Application PCT/CA2015/000433 entitled "Methods and Devices relating to Vibratory Impact Adult Devices." As depicted a vibratory motor 500 according to an embodiment

TABLE 2

Flexible Drive-Shaft Materials Analysis for Very-Small Bend Radii Scenarios

| Material | E GPa | Sy MPa | $\sigma_f$ MPa | $E/\sigma_f$ | Min Shaft Dia. Inches | Max Wire Dia. Inches | Power Loss (at Minimum Diameter) (W) | Loss Factor |
|---|---|---|---|---|---|---|---|---|
| METALS | | | | | | | | |
| Spring Steel (ASTM A228) | 210 | 1585 | 650 | 323 | 0.0083 | 0.0080 | N/A | N/A |
| SS 302 | 193 | 276 | 234 | 825 | 0.0150 | 0.0031 | N/A | N/A |
| SS 304 | 193 | 290 | 241 | 801 | 0.0147 | 0.0032 | N/A | N/A |
| SS 316 | 193 | 290 | 269 | 717 | 0.0147 | 0.0036 | N/A | N/A |
| NiTinol | 83 | 500 | 400 | 208 | 0.0123 | 0.0125 | N/A | N/A |
| PLASTICS | | | | | | | | |
| Teflon | 0.25 | 12.4 | 6 | 42 | 0.0422 | 0.0625 | 0.016 | 0.1 |
| Nylon (Nylon 66) | 1.5 | 66 | 35 | 43 | 0.0241 | 0.0607 | 0.010 | 0.1 |
| Delrin | 1 | 65 | 25 | 40 | 0.0243 | 0.0651 | 0.007 | 0.1 |
| Hostaform | 2.85 | 64 | 15 | 190 | 0.0244 | 0.0137 | 0.020 | 0.1 |
| ELASTOMERS | | | | | | | | |
| Silicone Based Elastomer (Soft) | 0.001 | 2.4 | 2.2 | 0.455 | 0.0729 | 5.7291 | 0.002 | 0.4 |
| Silicone Based Elastomer (Hard) | 0.005 | 5.5 | 5.2 | 0.962 | 0.0553 | 2.7083 | 0.004 | 0.4 |

Figure 4:
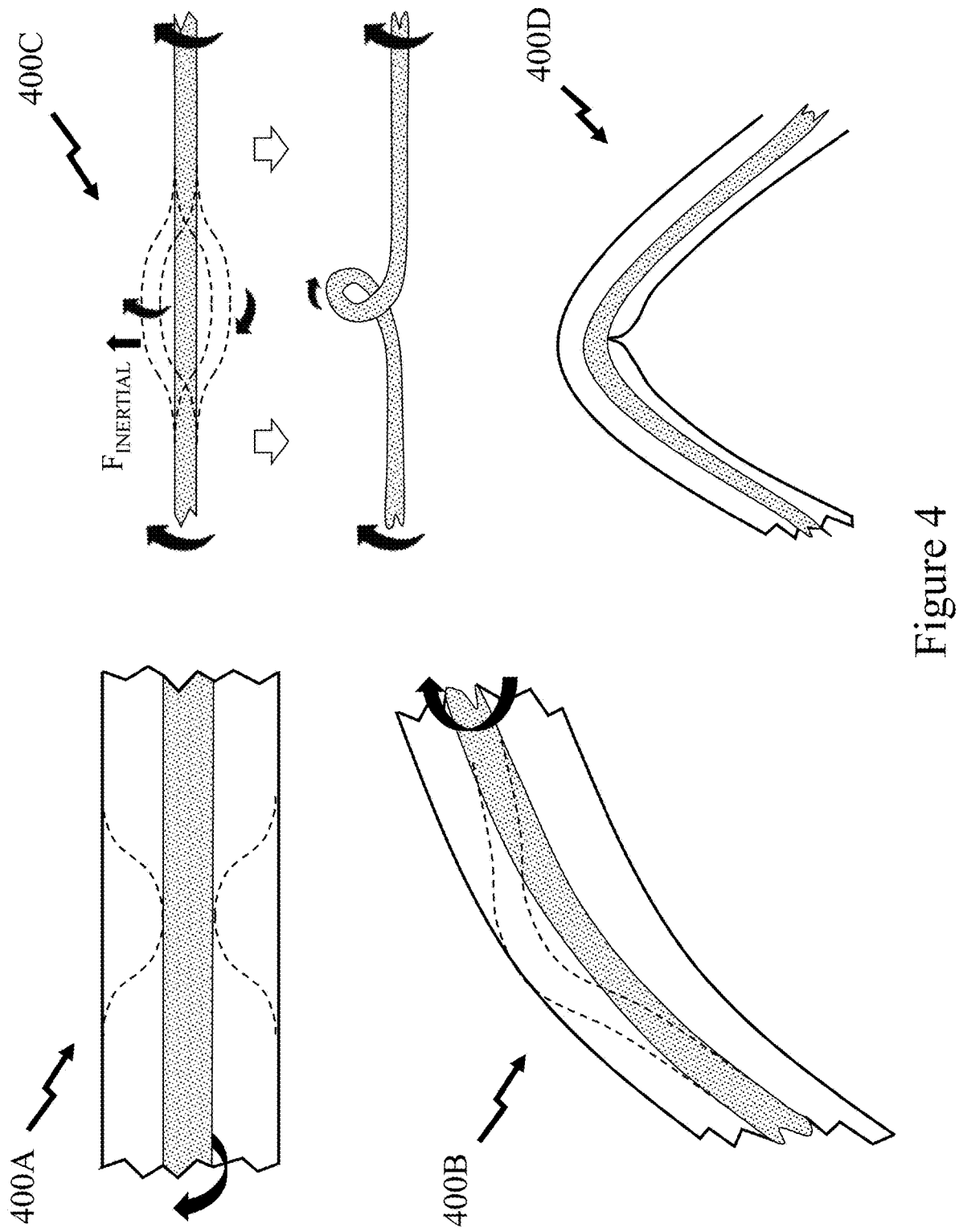
FIG. 4 depicts potential issues with flexible cabling between motive means and mechanical actuators.

However, as depicted in FIG. 4 the deployment of flexible cables between motive means and vibratory elements is not without issues as indicated by first to fourth images 400A to 400D respectively. As depicted these comprise:

First image 400A with pinching of an outer casing/protective tubing against the flexible shaft;

Second image 400B with flexing of the flexible shaft such that it makes contact with an outer casing/protective tubing;

Third image 400C with flexing of the flexible shaft such that the inertial forces result in the shaft twisting back on itself; and Fourth image 400D wherein under sharp flexing the outer casing/protective tubing pinches again contacting the flexible shaft.

Accordingly, it is important in the design of the ADDEV that appropriate consideration and engineering attention is given to these mechanisms and others that result in the flexible drive frictionally affected, snagging, stopping etc. For example, lighter smaller diameter cables of highly flexible materials may be prone to some effects whereas large heavier cables may suffer other effects. This is particularly important with wearable ADDEVs where according to the regions of the body traversed by the flexible drive of the invention with first and second flexible drives 510A and 510B coupling motor 505 sequentially to first and second gear assemblies 5100A and 5100B respectively. As depicted first gear assembly 5100A comprises a central gear 520 together with radial gears 530 which engage ring gear 540. The ring gear 540 as depicted in end view 500A has an asymmetric weight distribution. Accordingly, it would be evident that a plurality of gear assemblies may be disposed within an ADDEV being driven from a single motor 505 but within an outer body that allows deflection/distortion as each of the gear assemblies can move relative to the others and the motor 505 through the flexible drives. It would be evident that sequential gear assemblies may be of different designs as depicted wherein second gear assembly 5100B may exploit an asymmetric weight as evident in second end view 500B but now is directly driven at the rate of the motor 505 through disc 550 to ring 560. In contrast ring gear 540 being driven via central gear 520 and radial gears 530 is rotating at a reduced rate to that of the flexible drive shaft. Accordingly, the motor can drive lighter weights at high rotation rates or heavier weights at lower rotation rates.

Figure 6:
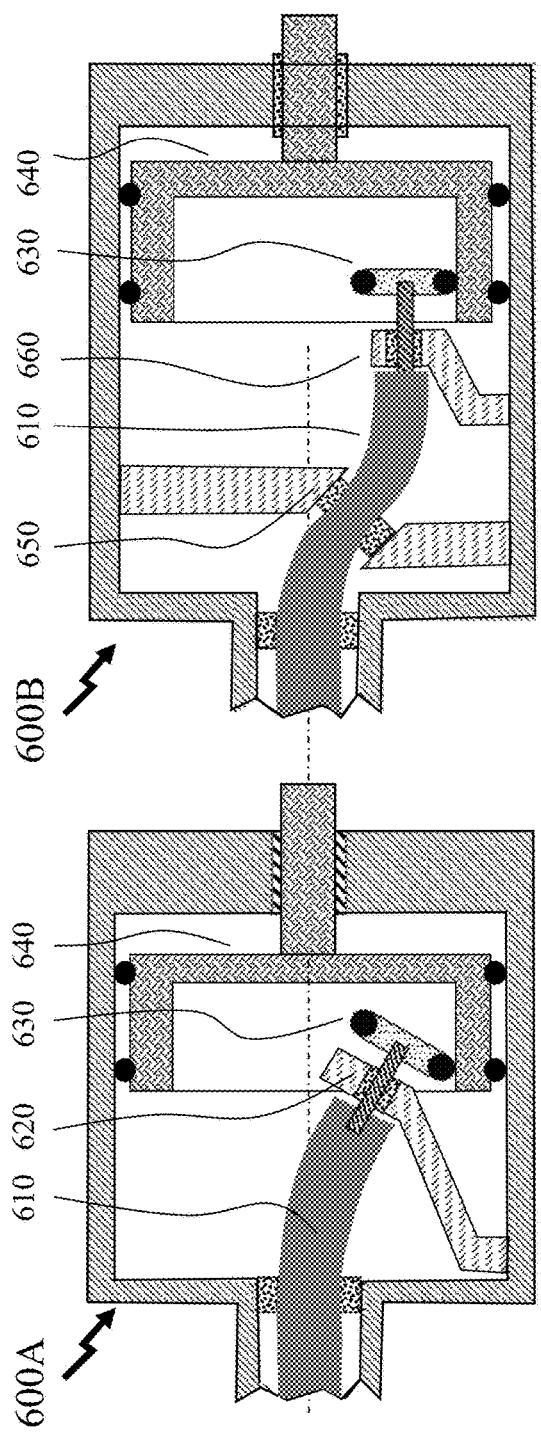
FIG. 6 depicts coupling structures between a flexible drive shaft and a rotating actuator according to embodiments of the invention.

Within FIG. 5 the flexible drive shafts, first and second flexible drives 510A and 510B, are directly coupled to the central gear 520 of first gear assembly 5100A and disc 550 of second gear assembly 5100B. However, in other embodiments of the invention the flexible drive shaft may engage another element within the drive train through frictional engagement such as depicted in FIG. 6 with first and second images 600A and 600B respectively according to an embodiment of the invention and as described by the inventors within World Patent Applications PCT/CA2015/000433 wherein the coupling between the flexible drive shaft 610 to the drive element 640 is via a driving wheel 630 which in first image 600A is angled relative to the axis of the drive element 640 and is maintained in position via first mount 630 which is attached to the scaffold or casing of the ADDEV within which the drive element 640 is rotating. In second image 600B the driving wheel 630 is now axial to the drive element 640 through the use of second mount 660 but in order to maintain a geometry without kinks, twists, etc. the flexible drive shaft 610 is also guided via third mount 650. Optionally, if the length and curve are carefully controlled then no guides may be necessary.

Figure 7:
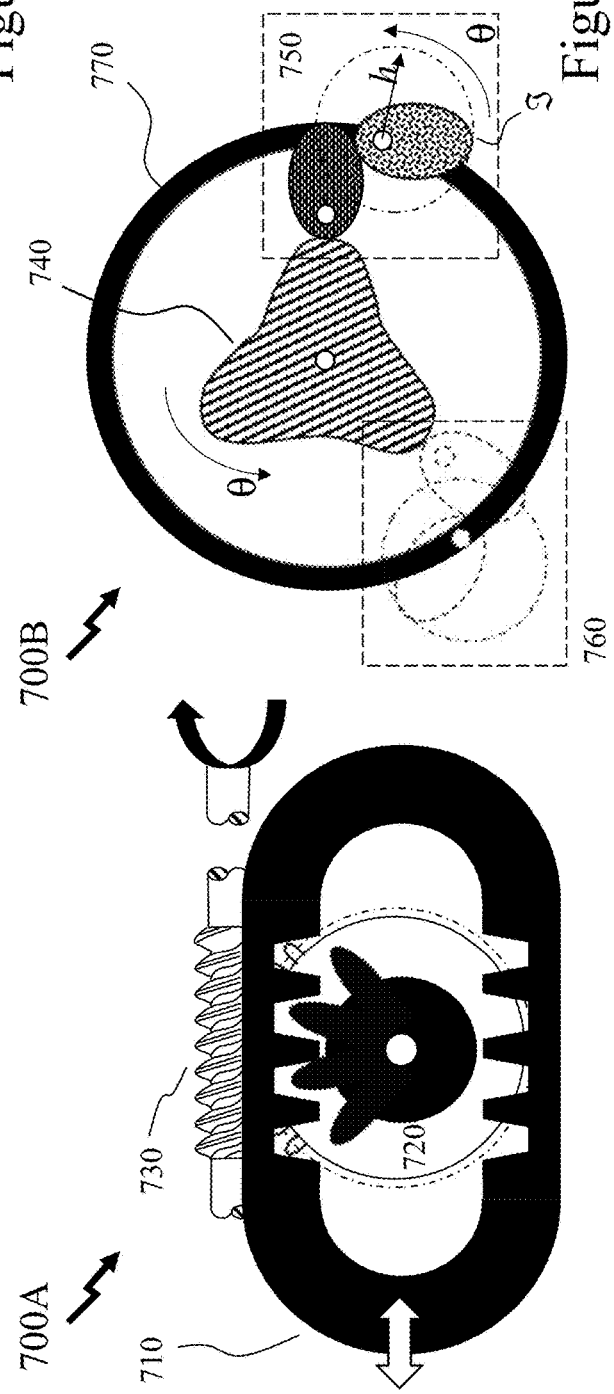
FIG. 7 depicts linear reciprocating and non-linear reciprocating actuators according to embodiments of the invention.

Whilst the vibratory/impact elements depicted in FIGS. 5 and 6 are based upon rotating asymmetric weights first and second images 700A and 700B in FIG. 7 depict examples of linear reciprocating and aperiodic rotary elements supported by embodiments of the invention. 7 depicts linear reciprocating and non-linear reciprocating actuators according to embodiments of the invention and are similarly described by the inventors within and as described by the inventor within World Patent Applications PCT/CA2015/000433. Accordingly, first image 700 depicts a worm drive gear 730 rotating under action of a flexible drive shaft it is coupled to which engages gear 720 and rotates this continuously. However, the partial teeth set on the gear 720 only periodically engages the linear element 710 for part each rotation such that on a first portion the linear element 710 is driven in one direction, for a second portion the linear element 710 is driven in the other direction and for the remainder the linear element is not driven. In contrast in second image 700B the central cam 740 is driven continuously as are the first and second followers in follower pair 750 where the second follower is attached to the scaffold 770 of the ADDEV. However, through the cam 740 profile and elliptical geometries of the first and second followers the resulting profile for the distance of the tip $\Im$ radially from the scaffold 770 us periodic but characterized by only short peaks outside the scaffold 770 radius such that the tip $\Im$ gives periodic "pulses" rather than continuous vibration.

Figure 8:
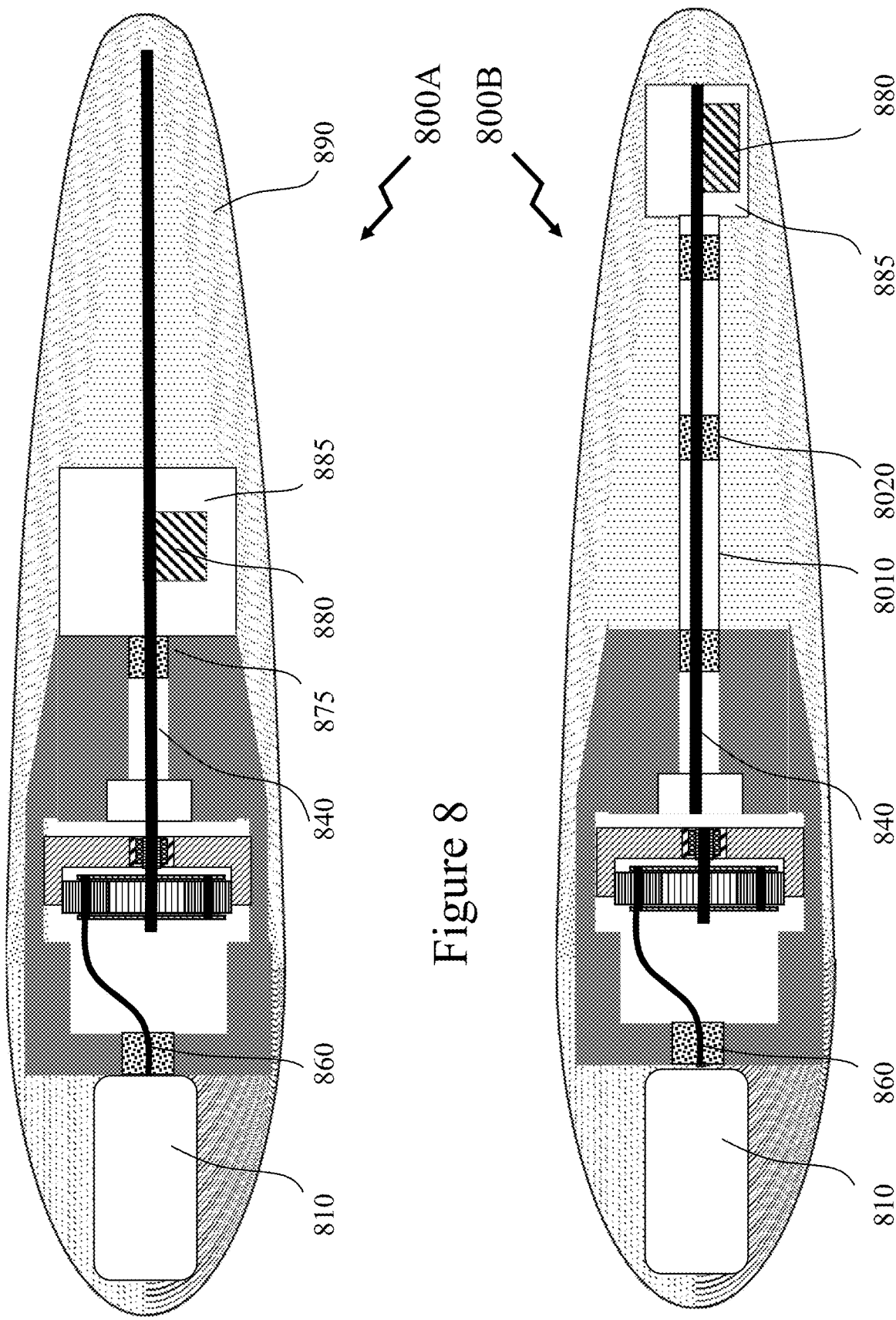
FIG. 8 depicts flexible vibratory elements according to embodiments of the invention with flexible drive and interconnection shafts together with flexible drive shaft and geared reduction stage.

Now referring to FIG. 8 there are depicted first and second ADDEVs employing two other vibratory element configurations in first and second images 800A and 800B respectively. These again exploit rotary asymmetric weights and are described by the inventors within and as described by the inventor within World Patent Application PCT/CA2015/000433. Considering both first and second images 600A and 600B respectively then these represent cross-sectional side elevations of ADDEVs exploiting a Gear Reduction Drive Vibrating Element (GRD-VIBEL) wherein a motor 810 is coupled to flexible drive shaft 860 and therein to a Gear Reduction Drive (GRD) that reduces the high efficiency high rotation rate output of the motor 810 to a lower speed rotation of the output shaft 840. In first image 600A this output shaft 840 projects to the end of a region of the ADDEV but has disposed part way along an asymmetric weight 880 within a chamber 885 within the ADDEV scaffold/casing. The asymmetric weight 880 is supported by bushing 875 and elastomer 890 of the ADDEV. Accordingly, the asymmetric weight under rotation of the shaft results in vibration which is transferred to the ADDEV via the shaft 840. In second image 800B the asymmetric weight 880 and chamber 885 are now at the end of that portion of the ADDEV and the shaft 840 is supported within a bore 8010 by additional bushings 8020 disposed along the bore 8020.

Having outlined the requirements of flexible drive shafts in Table 1, their issues in FIG. 4, and VIBEL geometries operable in conjunction with a flexible drive shaft in FIGS. 5 to 8 the inventors now describe and depicted some solution strategies for the flexible drive shaft element and configurations of ADDEVs exploiting them. A wide variety of configurations and permutations of such devices are possible, as would be evident to one of skill in the art, both with the VIBELs depicted and with other VIBELs etc. The device generally functions to provide a flexible and durable connection between a motor and a constant torsional load.

Figure 9:
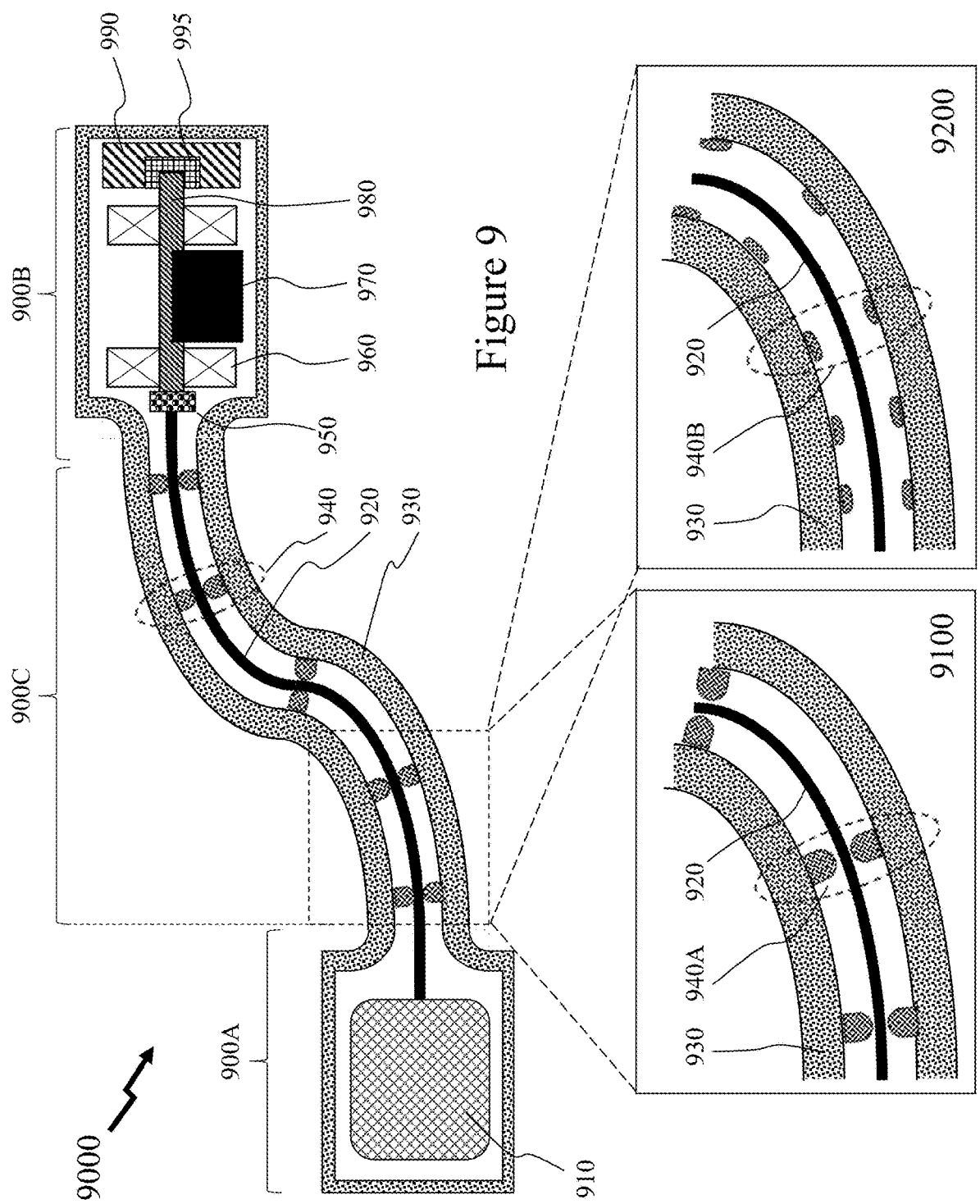
FIG. 9 depicts flexible drive train interconnections between a vibratory element and a motive means according to an embodiment of the invention.

Referring to FIG. 9 there is depicted in schematic 9000 of a motive means 900A—flexible drive shaft 900C—vibratory element (VIBEL) 900B configuration according to an embodiment of the invention exploiting a simple flexible motor to VIBEL. As depicted the motive means comprises a motor 910 whose output shaft is coupled to a flexible drive shaft 920 disposed within a sheath 930 wherein the other end of the flexible shaft is coupled to a shaft 980 with an asymmetric weight 970 supported by bearings 960. The other end of the shaft 980 is coupled to a thrust bearing 995 within a mount 990. This represents perhaps the simplest case, in which the flexible shaft 920 is connected via a flexible-shaft adapter (not depicted for clarity) to the motor 910. The motor 910 can then transmit torsional power at a bend angle to a distant load unit, VIBEL 900B. The flexible shaft 920 is connected via a flexible-shaft adaptor 950 to a rigid shaft 980, which is connected to an eccentric weight 970 that generates a vibrational load, which is called the load unit or VIBEL. The rigid shaft 980 is constrained from moving by the bearings/bushings 960, but is free to move axially and rotate. The shaft 960 can optionally be fitted with a thrust bearing 995 to prevent axial motion. The flexible shaft is surrounded by a sheath 930, e.g. a plastic sheath, which can be incorporated into the plastic casing/scaffold of the ADDEV.

Flex-shaft bushings 940 are incorporated into the sheath 930 in order to prevent the flexible shaft 920 from vibrating, chattering, or in general coming into contact with the sheath 930, which as noted can cause failure due to wear or fatigue. These flex bushings 940 also prevent dynamic instability of the flexible shaft, and therefore must be incorporated at regular intervals. Optionally, in other embodiments of the in invention a flexible shaft may be housed within as tube, e.g. a Teflon™ tube, without any discrete bushings within the tube. The inner hole of the flexible-shaft bushings 940 are rounded in order to prevent constraining the flexible shaft from bending. Flexible-shaft end bushings are incorporated at the start and end of the flexible section in order to ensure that the same end-tangent angles are applied to the flexible shaft as are its sheath. This helps minimize loads on the shaft; when the same end-tangent angles, positions and loads are applied to the sheath and shaft, the resulting shape of these will be identical, irrespective of material properties. The gap between the flexible shaft and the sheath inner wall (that is the sheath inner diameter), are sized in order to allow a degree of geometric misalignment between the end-tangents of the sheath (or realistically the plastic housing) and the flexible drive-shaft. Such flexible-shaft bushings 940 being depicted in second image 9100 as first bushings 940A. However, in other scenarios due to the dimensions of the sheath, range of motion of the ADDEV to support wearable use and/or non-wearable use may be significantly larger than the diameter of the flexible shaft 920. In this instance the bushings may become as depicted in third image 9200 wherein the flexible drive shaft sits primarily free of contact with essentially bushing "bumps" 940B limiting contact of the flexible drive shaft 920 and sheath 930 in the event there is contact.

Figure 10:
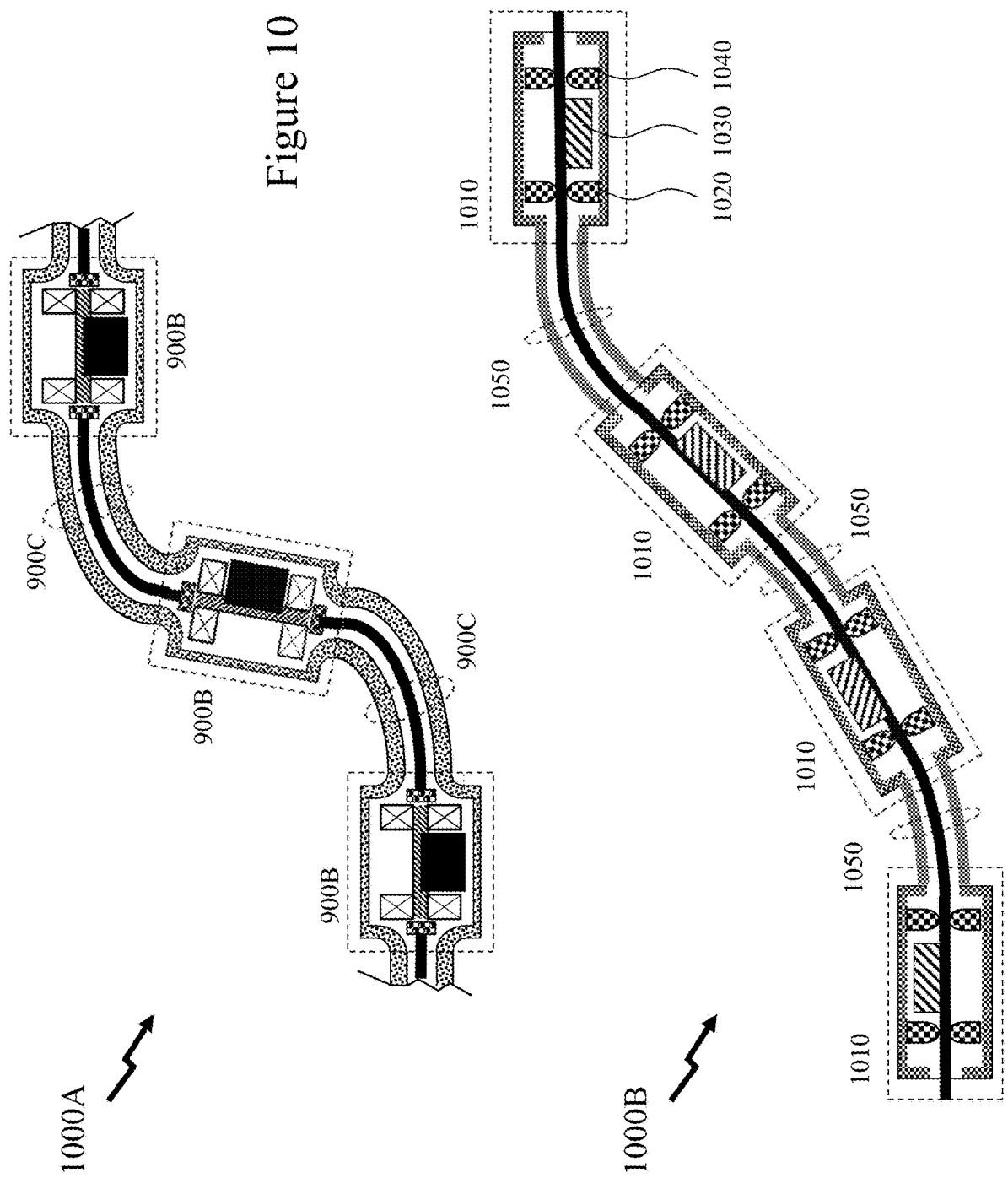
FIG. 10 depicts flexible drive trains with multiple interconnections and vibratory elements coupled serially to a common motive means according to an embodiment of the invention.

Now referring to FIG. 10 there is depicted a higher complexity solution 1000A wherein essentially a plurality identical VIBEL 900B components, as depicted in FIG. 9 for the simple flexible-motor-to-load connection, except that multiple VIBELs 900B are connected in series via multiple, typically shorter, flexible drive-shafts 900C. Such a solution 1000A may, for example, be employed in wearable vibrators, anal-beads, clitoral—labial—anal strings, etc. Each load may be smaller than the simple case in FIG. 9 providing the user with a more distributed vibrational effect. For example, a clitoral—labial—anal strings would run from the mons pubis region over the clitoris, over the labia of the user and down between their thighs to their anus. Optionally, a drive shaft splitter may provide vaginally inserted elements. By appropriate design of the controller, battery etc. such an assembly can be worn within/under clothing or integrated into lingerie/underwear.

Also depicted in FIG. 10 is an alternate VIBEL string in solution 1000B wherein a series of VIBELs 1010 are connected via flexible drive shafts 1050. Similar to solution 1000A except that the weights 1030 are attached to the drive-shaft itself for mechanical simplicity and also for improved flexibility. In order to retain flexibility, the plastic sheath must remain relatively narrow, and thus the weights inside of the vibrating string must have relatively small radii, though their total power output can add up to that of a regular concentrated weight. A larger-diameter sheath could still be made by using a hard-durometer silicone mesh sheath configuration, where the sheath is not a cylindrical shell, but a cylindrical lattice made from silicone. The weight being "supported" by bushings 1030 and 1040 at either end of the weight 1030.

Optionally, the multiple weights within a string of VIBELs such as depicted in FIG. 10 may be within "chambers" formed within an ADDEV such as depicted in FIG. 8 wherein the flexible drive shaft between each pair of VIBELs is within a sheath and this is then embedded within silicone with a scaffold defining chambers such that there are no bushings and the weight is supported at either end by the silicone. For example, short weights may be used with low spacing or moderate/large spacing. The final VIBEL terminating the flexible drive shaft may in some embodiments of the invention be terminated with a thrust bearing in order to maintain tension within the flexible drive shaft.

Figure 11:
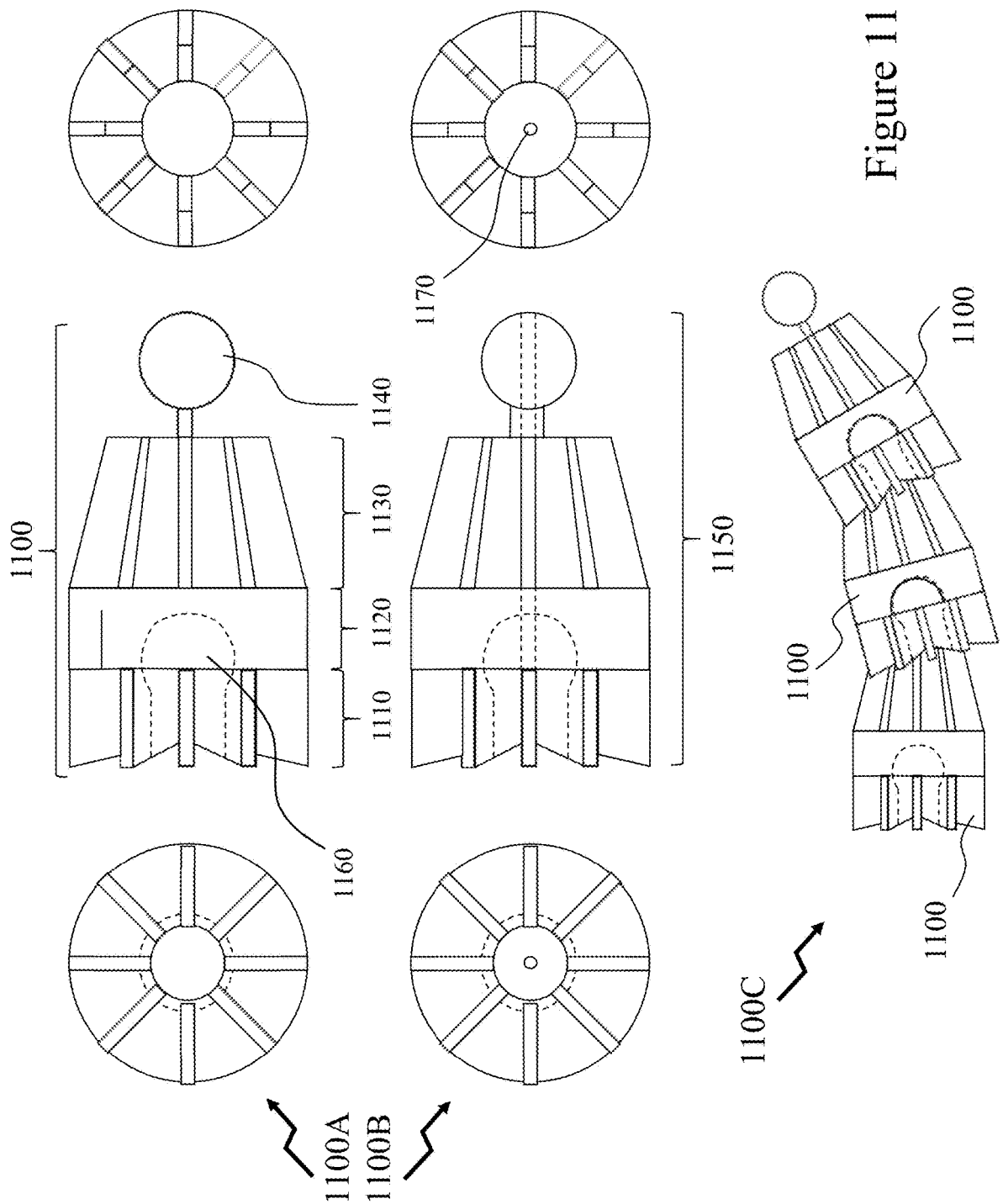
FIG. 11 depicts flexible joint structures for a scaffold of a device according to embodiments of the invention exploiting flexible drive train interconnections between a vibratory element and a motive means.

Now referring to FIG. 11 there are depicted flexible geared ball joints/joint structures for a scaffold or flexible drive shaft of a device according to embodiments of the invention exploiting flexible drive train interconnections between a vibratory element and a motive means. As depicted in FIG. 11 there are first and second geared rotors 1100 and 1150 respectively wherein each single unit comprises both male and female mating gear components 1130/1110 respectively either end of a body 1120 together with socket 1160 and ball 1140 for a socket/ball joint. Consecutive links are added together in series as depicted in third image 1100C to achieve rotation using an inclined gear system. The ball joint provides alignment features, while the inclined gears allow relative rotation between connected pieces. First geared rotors 1100 are linked in series to produce an overall flexible drive-shaft, and design to maximize relative rotation angle and thus effective bend radius, minimize noise, and minimize complexity. However, second geared rotor 1150 includes a bore 1170 through them allowing a flexible drive shaft to run through to a subsequent VIBEL, for example.

Typically, the gears may be molded from a plastic or ceramic for example. Beneficially, such geared rotors allow for high torque transfer capacity, higher efficiency, and very high durability. Care must be taken to consider cost, complexity, and potentially limited bend radius as the incremental "turn" should be limited to approximately 30 degrees between links. Further, potentially miniaturization limits may impact minimum radius of curvature, potentially making them not suitable for tight curves or bends.

In addition to the flexible shaft material design and selection other aspects of the flexible drive shaft to consider are the sheath design, flexible shaft bushings, lubrication, motor noise, mechanical chatter and propeller noise. The flexible drive-shaft may run inside a protective channel to prevent contact with external objects that would prohibit operation (due to the bending/moving nature of the device, e.g. the flexible shaft moves relative to internal components, therefore needs a protective sheath. A plastic sheath material may be typically chosen for low friction and excellent wear characteristics. The geometry is designed so that the sheath itself is adequately flexible, whilst the wall thickness is adequate to resist pinching from an expected external load (for example a person sitting on the toy), as well as having a stable cross-section that would prevent the crippling instability when subjected to the bending stresses, as well as annular cylinder radial buckling instability (the sheath pinches in on itself when bent too much). The tightness of fit of the plastic sheath around the rotating shaft is also a design parameter, a tight-fitting sheath will wear much more quickly, may promote premature failure of the shaft, as well as increase energy loss due to friction. Adequate spacing is allowed between the shaft and sheath inner-walls to allow the shaft to bend in a different radius of curvature from the sheath. Shaft contact with the sheath must be prevented as it is known to lead to premature failure of the shaft.

The flexible shaft bushings described within embodiments of the invention may be short-length plastic bushings inserted into the sheath at equal or unequal spacing to prevent the flexible drive shaft contacting the sheath, minimizing friction via a smaller contact area, and also providing structural stability of the flexible drive shaft against the dynamic twisting instability, as well as prevent crippling instability of the sheath itself. The added effect of such bushings is also to allow the flexible shaft to carry weights without shaking excessively.

An alternative to the use of bushings is to fill the shaft with a lubricating fluid. As the shaft spins, the stabilizing effect of hydrodynamic lubrication will prevent it from coming in contact with the sheath itself and also minimize wear. Disadvantages however include possibly high frictional losses due to viscosity, as well as increased complexity.

With general wearing of wearable ADDEVs in public noise control is also an important factor. Sources of noise include, but are not limited to, motor noise (noise inherent to the operation of an electric motor), spinning weight noise (propeller effect), and material contact such as rubbing or chatter. Propeller, or aerodynamic, noise is associated with the spinning of an object in air at high speeds and is largely controlled by the tip-speed of the weight such that gear reduction drives should present lower noise. Material contact from rubbing arises from contact between two bodies that are moving relative to one another, and associated with surface deformation effects. This can be manifested as bushing squealing, or a metal-on-metal rubbing for components with rougher finishes. Mechanical chatter arises from contact with vibrating components and can be quite high pitched and the most significant noise source, as it is inherent to the function of a vibrator. Can occur between two stationary components, or a rotating and stationary component, such as a shaft and bushing.

Accordingly, within wearable and/or remote drive ADDEVs noise control strategies offer benefit. Motor noise allows the motor to be separated from the weight, so that the motor can be located within the body, for example within the vagina, which may reduce noise. Alternatively, it can be placed in an area of the device where noise-suppressing elements such as heavier silicone use could also mitigate this source. Mechanical chatter between stationary-stationary components may be reduced through appropriate fit of components in order to prevent instantaneous separation. For example, a strong enough compressive fit will render the two stationary components to be moving as if they were one piece. Alternatively, a noise-reducing material such as a foam, rubber, etc. between contacting surfaces can be employed, which will soften the blow when one component strikes another. Chatter between stationary and moving components may be addressed in several manners. For example, bushing and solid shaft noise can be mitigated by having appropriately small clearances between the rotating shaft and bushing, though with this approach some chatter is inevitable as it is impossible in this case to press-fit the two components so that they move as one piece due to the need to not constrict relative motion.

Noise dampening may be achieved, for example, by adding a Teflon coating to the rotating shaft greatly reduces the chatter, as Teflon, when struck, generates significantly less noise than metal-to-plastic or metal-to-metal. Incorporating an elastomeric ring on the outside of a bushing which attaches it to the plastic casing may also reduce chatter by allowing the bushing to move with the shaft. An elastomeric ring of this sort acts as a kind of mechanical low-pass filter, permitting the low-frequency vibrations to be transmitted through to the plastic casing while damping the high-frequency bouncing of an impact that actually generates the noise. However, selection of an elastomeric material with an appropriate thickness is required such that the low-pass filter cut-off frequency of the elastomeric ring does not attenuate vibration but effectively mitigates noise. It would be evident to one of skill in the art that these noise mitigation/reduction techniques may be applied to the product as a whole, where silicone thickness and stiffness is selected to smooth out the vibrational characteristics of the device (although this might not be desirable from ergonomic/user experience perspective) or over specific regions.

Propeller noise, or more accurately the aerodynamic noise generated by the spinning weight might be mitigated by using a longer weight that has a smaller radius (but would have an equivalent vibrational capacity, $I_{XY}$). A smaller radius would reduce the weight's tip speed, which would substantially reduce the propeller noise. Using gear reduction to run a larger weight (requiring more torque) at a lower but ergonomically acceptable RPM would allow an output at an equivalent power with significantly decreased noise from all sources (noise generation is highly frequency dependent).

Figure 12:
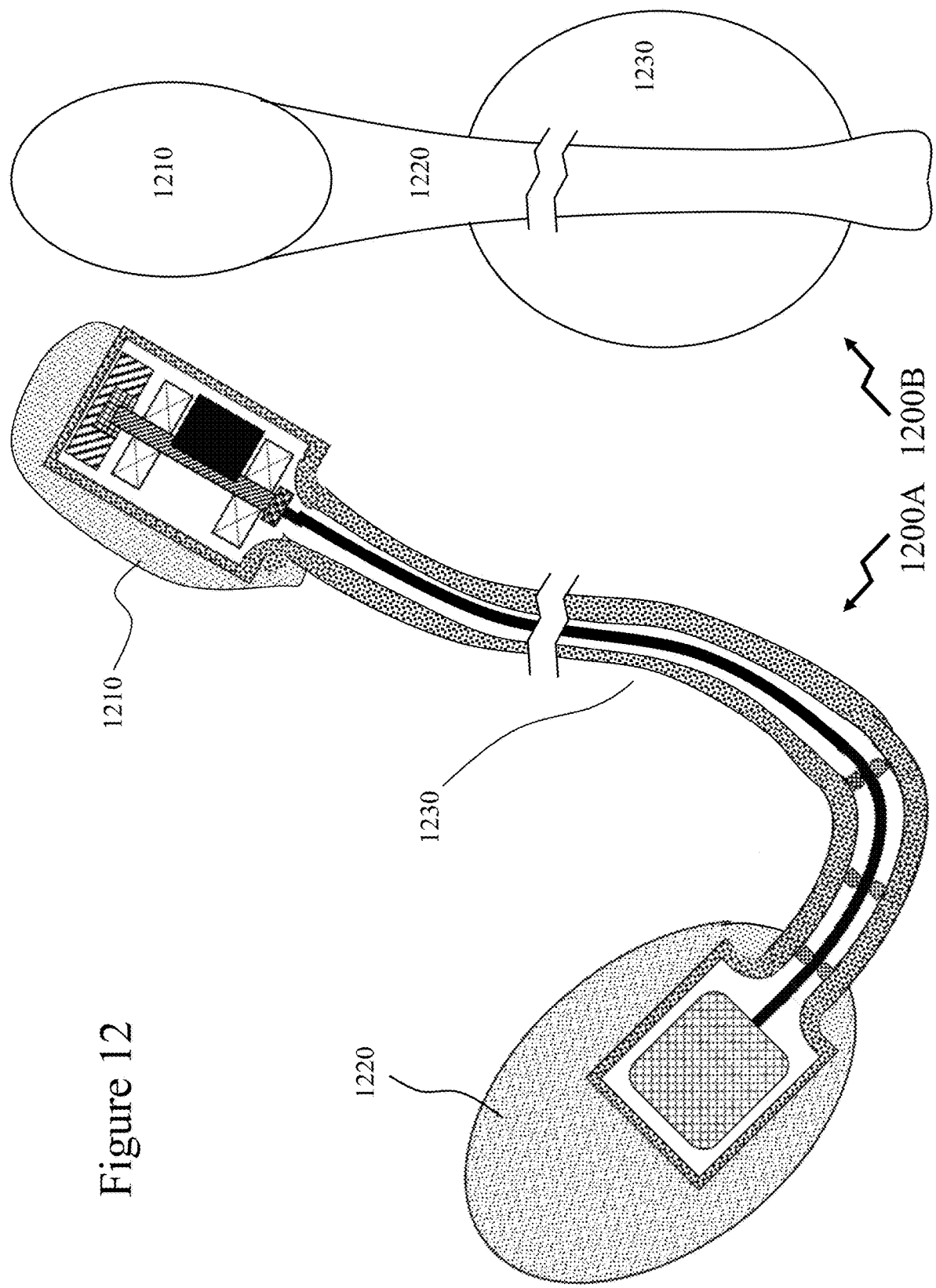
FIG. 12 depicts an adult device (ADDEV) exploiting a flexible drive train interconnection between a vibratory element and a motive means according to an embodiment of the invention.

Referring now to FIG. 12 there is depicted an ADDEV in first and second images 1200A and 1200B respectively exploiting a flexible drive train interconnection between a vibratory element and a motive means according to an embodiment of the invention wherein the wearable vibrator consists of an internal portion 1220 that resides within the body and contains all of the components including the noise-generating motor, as well as an external arm 1230 that reaches up and acts terminates in a clitoral stimulator 1210. Noise is significantly reduced using the above strategies for this product. The exterior arm is also made to be very narrow, which is also facilitated in a novel and unprecedented manner by the flexible drive-shaft that eliminates the need for an external motor. The external arm is also made as narrow as possible in the section coinciding with the vaginal opening, permitted also by the flexible drive-shaft and resulting in superior ergonomics. The stem can be made laterally narrower, as indicated in FIG. 12, in order to control the predominant direction and type of motion that the stem experiences, and also incorporate a gentle side-to-side swaying motion by sufficiently narrowing this section. The base of the stem can include deformable elements (either a mechanical ratchet mechanism, a deformable piece of metal, or a friction-based mechanism) to allow the user to personally tune the device to the curvature of their body.

The stem base of the stem, and the contour of the interior portion can also be functionally shaped to specifically allow the user apply leverage onto the device without the usage of their hands, in a seated position, so that the clitoral stimulator is pressed even more onto their body. An additional external arm can be added to the stem, reaching downwards in the direction opposite to the clitoral stimulator arm for this purpose. An extra external arm can also be added that reaches downwards for simultaneous anal stimulation. Optionally, as depicted below in respect of FIGS. 19 and 21 a means of adjusting the geometry of an ADDEV may be employed including malleable inserts and interlocking "cogs." Such malleable inserts may be continuously deployed within the ADDEV or deployed at predetermined locations and may be further combined with scaffold structures to enable motion.

Figure 13:
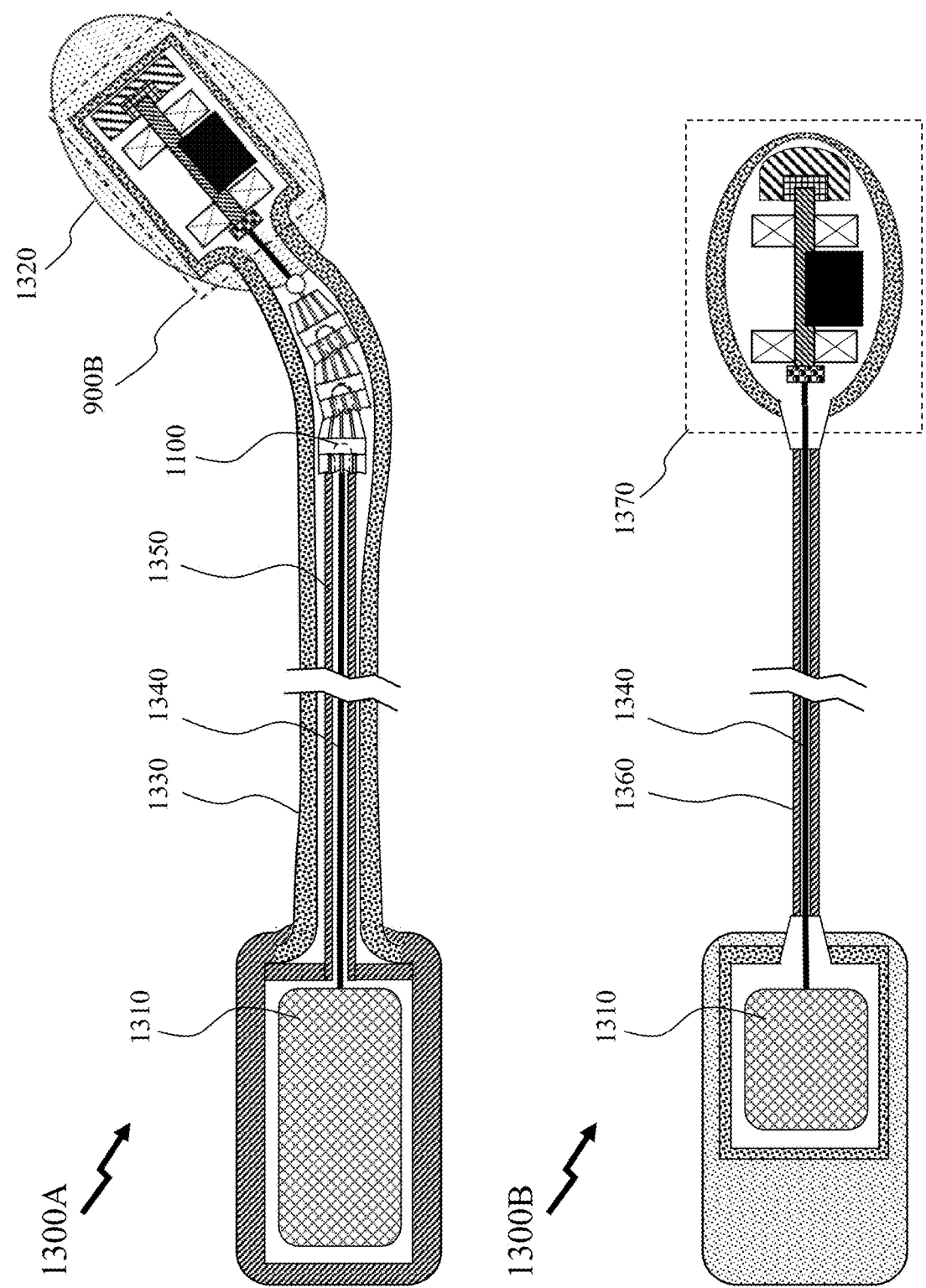
FIG. 13 depicts ADDEVs exploiting a flexible drive train interconnection between a vibratory element and a motive means according to an embodiment of the invention.

Now referring to FIG. 13 there are depicted first and second ADDEVs 1300A and 1300B exploiting a flexible drive train interconnection between a vibratory element and a motive means according to an embodiment of the invention. First ADDEV 1300A represents a variant of a G-spot vibrator wherein the VIBEL 900B is within a casing 1320 and is connected to the motor 1310 through a flexible drive shaft 1340 within a sheath 1350 and elastomeric coating 1330. The first ADDEV 1300A also comprising near the VIBEL 900B a series of flexible geared ball-joints/joint structures 1100. These may be adjusted by user on a trial-and-error basis for an ergonomic arrangement for extended use or short-term use according to their personal requirements. The combination of flexible geared ball-joints/joint structures 1100 and casing 1320 forming a semi-rigid or rigid shell such that the natural vaginal muscle position of the user maintains the first ADDEV 1300A in position whilst the thin flexible drive shaft and remote motor 1310 allow the long term use of the first ADDEV 1300A. Potentially, the drive shaft diameter may be as small as 5 mm (0.2") and have a length of 300 mm (12") for example such that the motor is between the users butt cheeks or up towards their waist. Second ADDEV 1300B depicts a similar device design but without the flexible geared ball-joints/joint structures 1100.

Optionally, a variant of ADDEV exploits the flexible drive shaft between VIBEL 900B and motor 1310 which is within a sheath 1350 such that the VIBEL 900B and flexible drive shaft are within an extended flexible silicone vibrating dildo shape which is highly flexible and may be inserted for extended periods of time with a remote motor 1310 unit.

Optionally, the highly flexible portion may contain multiple serially connected VIBELs such as described and depicted in respect of FIG. 10.

Now referring to FIG. 14 there are depicted first and second ADDEVs 1400A and 1400B exploiting flexible drive train interconnections between vibratory element and a motive means with intermediary gear reduction/fanout according to embodiments of the invention. As depicted in first ADDEV 1400A a pair of VIBELs 1430 are coupled via a first GRD 1420 to the motor 1410. In second ADDEV 1400B three VIBELs 1430 are coupled via a second GRD 1440. Optionally, the ADDEVs may exploit flexible drive shafts between each element such that the motor to first GRD 1420 in first ADDEV 1400A is flexible and the pair of drive shafts from the first GRD 1420 to the pair of VIBELs 1430 are flexible as well. In this manner a single motor 1410 drives a pair of VIBELs 1430 with potentially only a cable 4 mm (0.15") linking them. For example, the pair of VIBELs 1430 may be so-called "egg" designs for insertion into vagina and anus concurrently or for left and right testes/breasts or either side of the clitoral region for example. This may be extended with second ADDEV 1400B wherein three VIBELs may be concurrently driven such as clitoris, vagina and anus or a pair of testes and anus for example. Potentially, the second ADDEV may stimulate within a single item of clothing the nipples of a user and their clitoris for example.

Figure 15A:
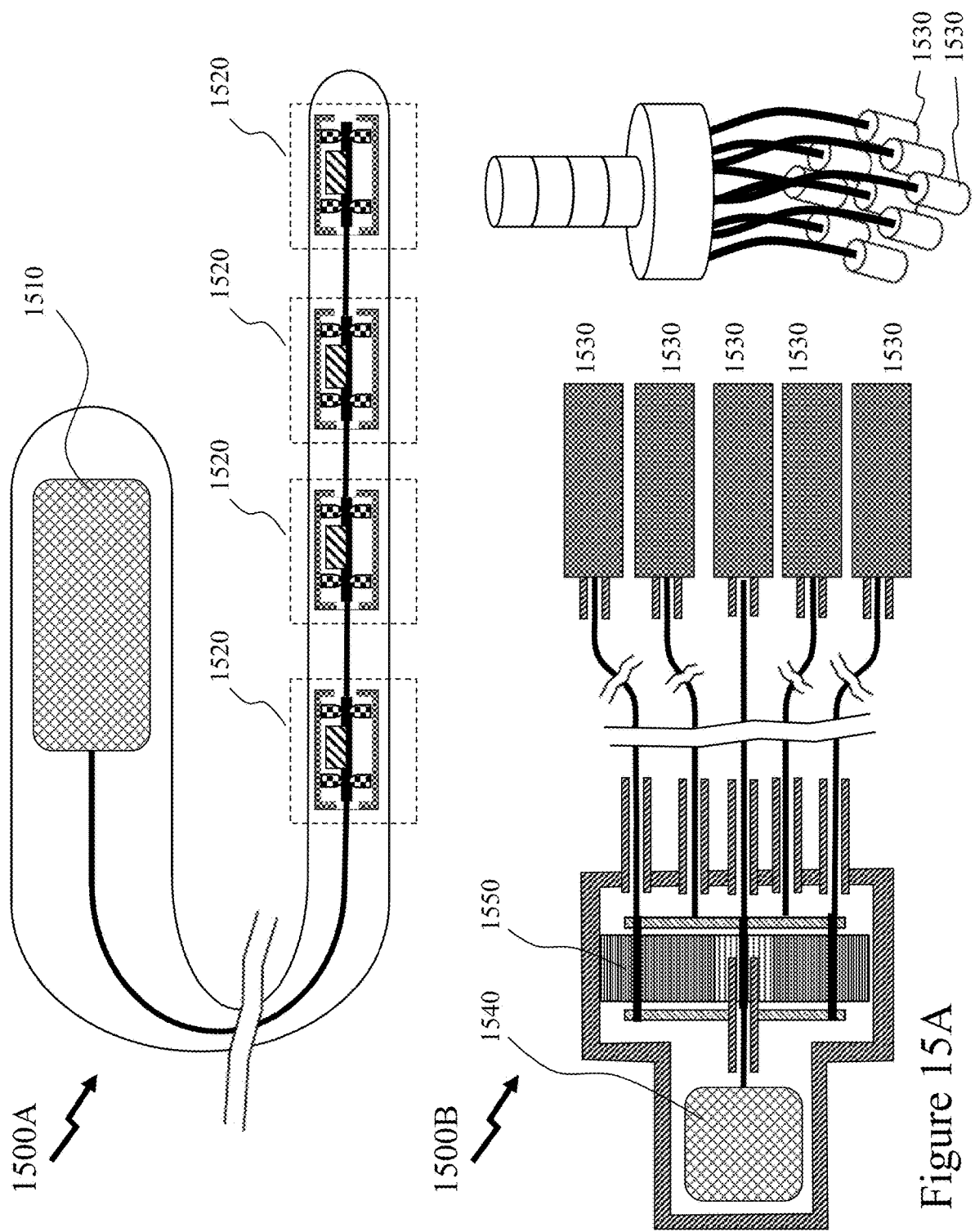
FIG. 15A depicts ADDEVs exploiting flexible drive train interconnections between vibratory element and a motive means with multiple serial actuators and intermediary gear reduction/fanout according to embodiments of the invention.

Now referring to FIG. 15A there are depicted first and second ADDEVs 1500A and 1500B exploiting flexible drive train interconnections between vibratory element and a motive means with intermediary gear reduction/fanout according to embodiments of the invention. First ADDEV 1500A employs a curved stem design wherein a remote motor 1510 is coupled via a small diameter sheath to a series of VIBELs 1520. Accordingly, the motor may be remote whilst the arm with the VIBELs is vaginally inserted but due to its small geometry it is concurrently worn during penetrative sexual intercourse. Second ADDEV 1500B extends the number of GRD 1550 outputs based upon the gear configuration. For example, a central gear driven from the flexible drive shaft might couple to 3 gears in a first ring around the central gear and these are then each coupled to a further pair of gears such that 10 flexible drive shafts connect to the VIBELs 1530. Depending upon the different gear radii these may all rotate at the same frequency or they may be geared differently for different rotation rates. Alternatively, different VIBELs may employ different weights with or without variable gearing. Optionally, the "arms" of the second ADDEV 1500B may exploit multiple serially connected VIBELs such as depicted in respect of FIG. 10. Optionally two or more motors 1510 may be coupled to multiple GRDs 1550 or multiple motors are directly coupled to the multiple "arms" and/or multiple GRDs 1550.

Figure 15B:
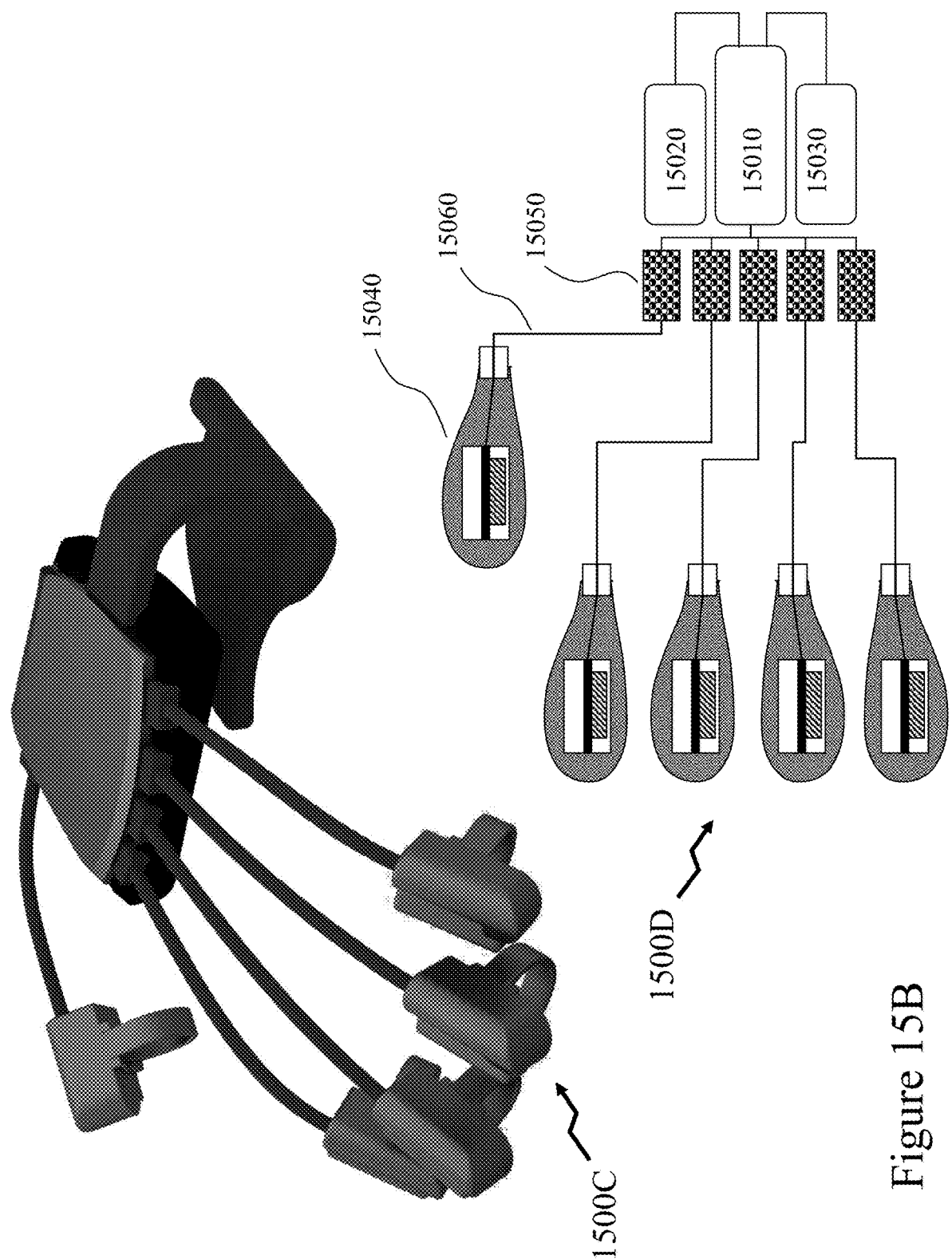
FIG. 15B depicts an ADDEV exploiting flexible drive train interconnection between a remote motor and a plurality of actuators.

Referring to FIG. 15B there is depicted a concept that may be associated with an ADDEV but may also be associated with other devices with adult and non-adult applications as may other embodiments of the invention. Within FIG. 15B there is depicted a vibratory glove in perspective view 1500C and concept schematic 1500D for massage as well as stimulation. As depicted each finger and the thumb have a fitting 15040 which is connected to a motor 15050 via a flexible drive shaft 15060. Whilst the embodiment depicted exploits multiple motors 15050 it would be evident that other embodiments may exploit a single motor or a number of motors less than the number of remote actuators. With multiple motors 15050 these may be controlled from a control circuit 15010 which is coupled to a battery 15020 and wireless transceiver 15030. Each motor 15050 can therefore be individually controlled such that the fittings 15040 may vibrate at the same and/or different frequencies. The fitting 15040 as depicted comprises a rotating asymmetric weight driven by the flexible drive shaft where the vibration arising from the rotating asymmetric weight is coupled to the user's finger and the user's body or other user's body via the shell of the fitting 15040. The fitting 15040 is depicted as having a ring around the user's finger however it would be evident that other embodiments may employ hard and/or elastomeric shells for the fitting 15040 allowing insertion of the fingertip or more of the finger. Accordingly, through the use of elongated lower profile vibrating elements embodiments of the invention support internal and external use of the vibrating finger glove. Optionally, with other vibrating elements such as pancake vibrators these may be integrated into the fitting 15040 in alternate embodiments of the invention. Accordingly, the controller may establish a control patterns supporting harmonic throbbing such as $f_0+\delta f$; $f_0$; $f_0-\delta f$; $f_0$; $f_0+\delta f$ or $f_0+\delta f$; $f_0$; $f_0+\delta f$; $f_0$; $f_0+\delta f$ for example as well as non-harmonic throbbing through all VIBELs being at the same frequency or offset by significant differences that the user's perception of throbbing is diminished.

Figure 16:
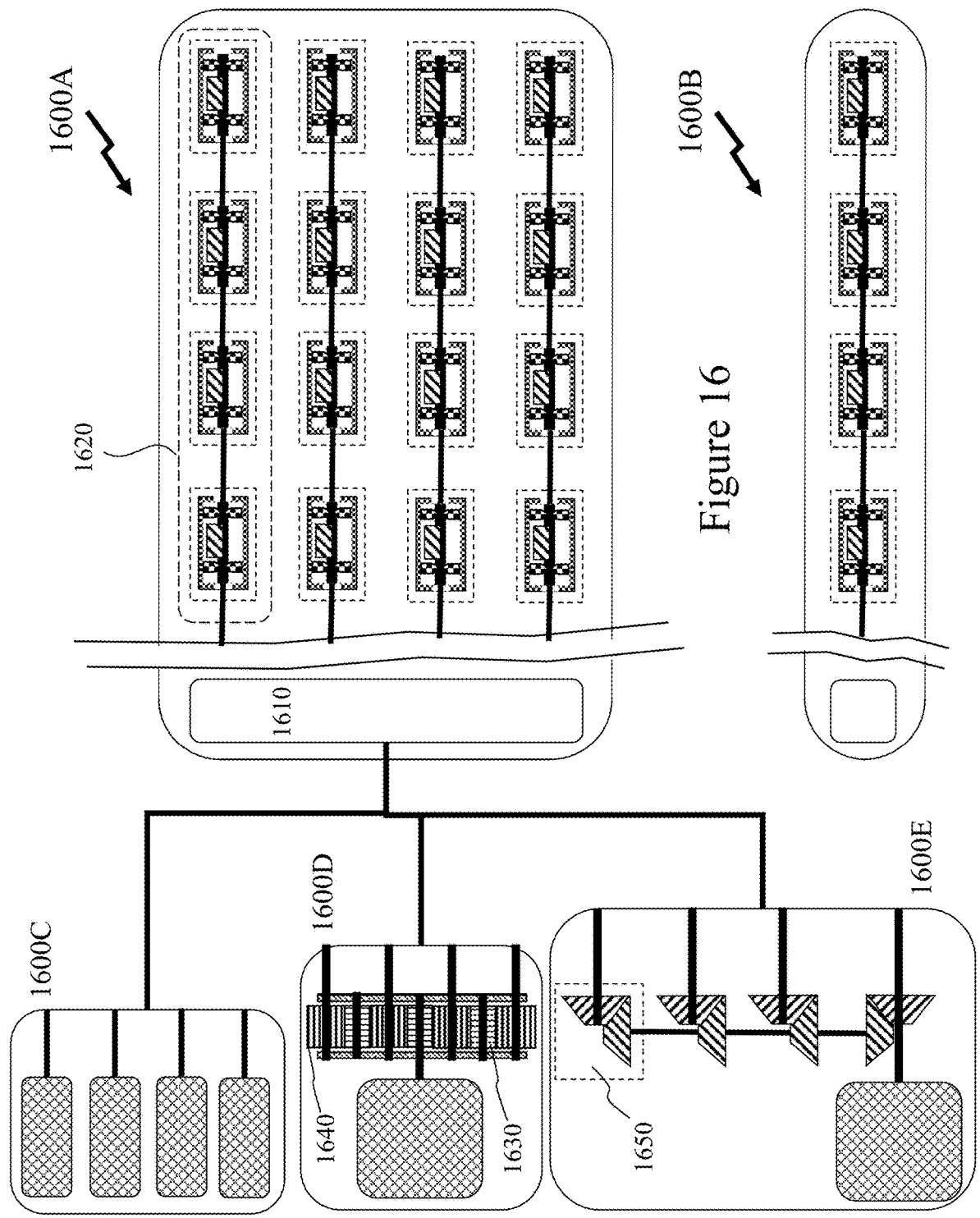
FIG. 16 depicts an ADDEV according to embodiments of the invention employing parallel serial actuator arrays within a sheet form with examples of different motive means interconnections.

Now referring to FIG. 16 there is depicted an ADDEV according to embodiments of the invention in plan and side views in first and second images 1600A and 1600B respectively. The ADDEV employing parallel arrays of serially disposed VIBELs in VIBEL strings 1620 within a sheet form coupled to a motive means 1610. As depicted first to third motor structures 1600C to 1600D are depicted as examples of different motive means and interconnections for the motive means. First motor structure 1600C exploits a discrete motor per VIBEL string 1620. Second motor structure 1600D exploits a single motor coupled to multiple VIBEL strings 1620 via a gear chain employ first and second gear types 1630 and 1640 respectively. These may be in a linear array rather than radially to maintain a low profile for the associated control and drive means of the ADDEV. Third motor structure 1600E exploits an array of bevel gears 1650 with a single motor. Optionally, such bevel and/or standard gear drives may compact integrated with the motor or separate from it. The ADDEV depicted in FIG. 16 provides a sheet/pad geometry with a silicone casing directly formed around the VIBELs within each "strand." As the performance requirements of the gear chain is simply to provide multiple drives without an integral asymmetric weight as with a GRD then these can be quite small, e.g. ~5 mm (~0.2").

Optionally, the gear train may be within the ADDEV and the motor remote. It would be evident that such as ADDEV may be fitted within clothing or integrated within an item of clothing. For example, the ADDEV may be integrated into underwear or lingerie with ease as it is primarily a "flat" sheet style device. Optionally, the number of parallel VIBEL strings 1620 may be other that shown and be 2, 3, 5, 8 or 10 for example. For improved fit as a wearable the lengths of the VIBEL strings 1620 may also vary such that within the crotch area the strings in the middle are the longest and as they progress away they shorted to follow the natural line of the human thigh at the abdomen. It would also be evident that the ADDEV is usable as both a wearable ADDEV and as a discrete ADDEV in a variety of manners from being held against the user's body or the user "mounting" it or kneeling onto it etc. In addition to sexual uses the ADDEV may also provide women with relieve from menstrual cramps or provide users with a massager "sheet" for their feet, back, neck etc. Optionally, the VIBEL strings may run perpendicular to a longer axis rather than parallel as shown or be deployed in a range of geometries. For example, they may taper such that their spacing is close at one end of the "sheet" and wider at the other. Further, whilst a rectangular "sheet" construction has been depicted it would be evident that the ADDEV may be square, circular, elliptical, polygonal, irregular etc. according to the desired location, fit, and use of the ADDEV. It would be evident that such ADDEVs may be used flat or on curved and/or irregular surfaces such that they conform towards the user's body by the pressure of the user or pressure from the user's clothing, apparel, etc. Optionally the "sheet" can be rolled and held around the male penis.

Figure 17:
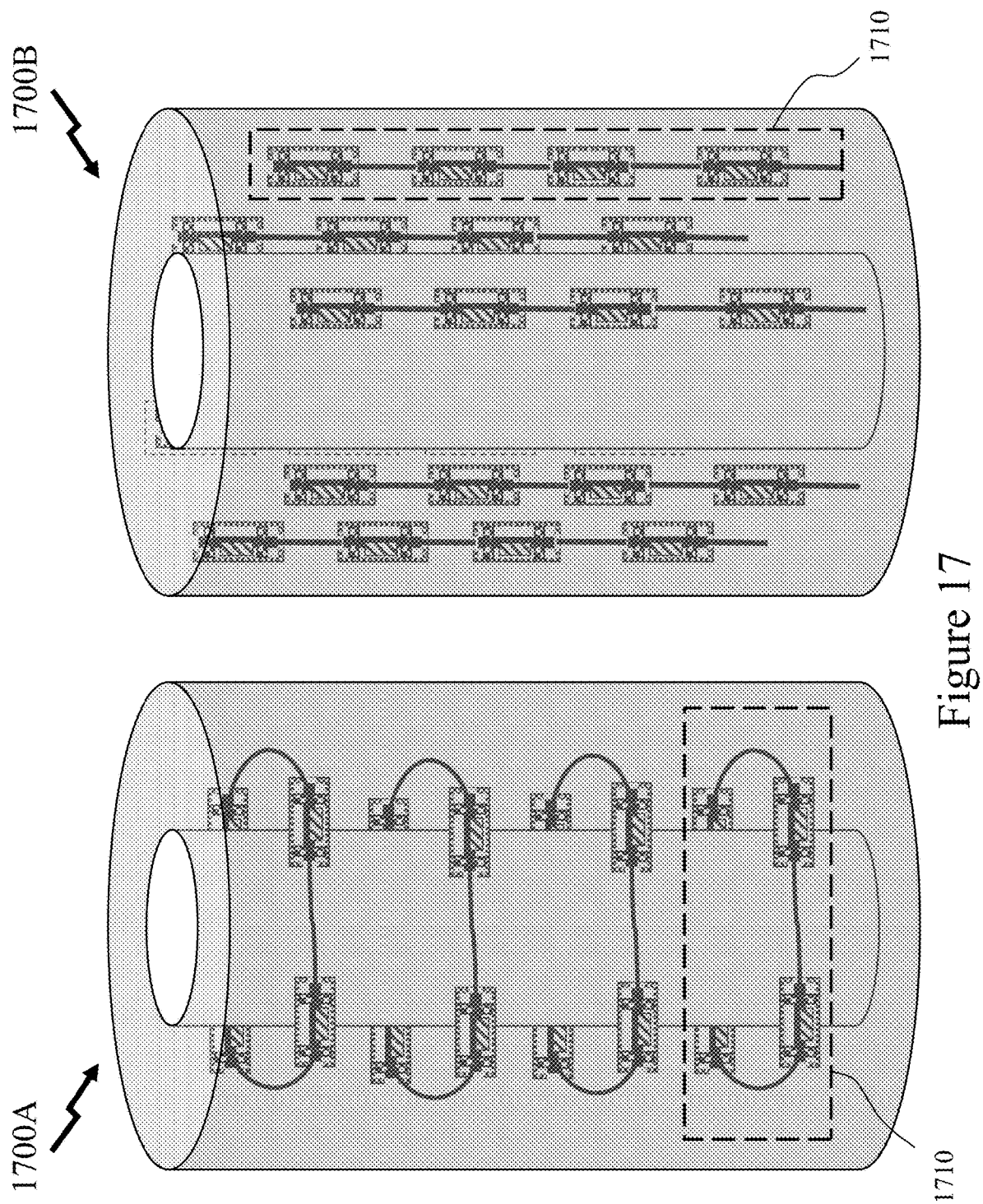
FIG. 17 depicts ADDEVs according to embodiments of the invention employing parallel serial actuator arrays within a sheath.

Referring to FIG. 17 there are depicted first and second ADDEVs 1700A and 1700B respectively according to embodiments of the invention employing parallel serial actuator arrays within a sheath. Essentially, these are similar construction as that of the ADDEVs in FIG. 16 except that the "sheet" has been rolled up and implemented as a tube for surrounding the male penis for example. Within first and second ADDEVs 1700A and 1700B the VIBEL strings 1710 are perpendicular and parallel to the longitudinal axis of the ADDEV. Optionally, particularly, first ADDEV 1700A, the ADDEV may be sold with markings allowing the ADDEV to be shortened by cutting of one or more sections and associated VIBELs. Optionally, either ADDEV may be flexible enough to allow the ADDEV to be turned inside out for cleaning or to provide different surface textures as the inner/outer surfaces of the ADDEV may have nubbies of one or more designs formed upon them.

Figure 18:
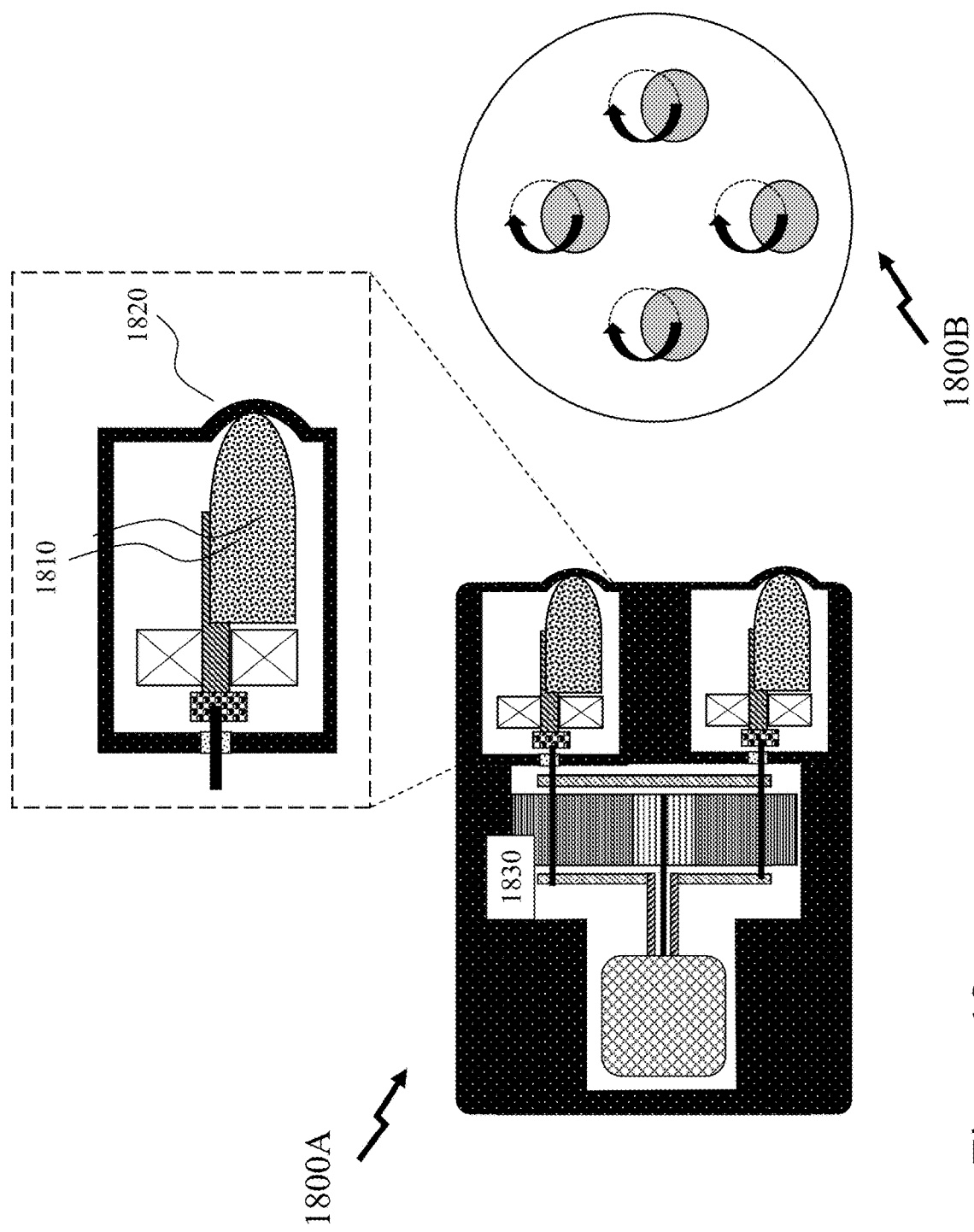
FIG. 18 depicts an ADDEV exploiting multiple vibratory elements coupled to a gear reduction with flexible or non-flexible drive shaft interconnections according to embodiments of the invention.

Now referring to FIG. 18 there is depicted an ADDEV exploiting multiple vibratory elements coupled to a gear reduction with flexible or non-flexible drive shaft interconnections according to embodiments of the invention. However, the asymmetric weight 1810 now through the silicone casing 1820 of the device is now essentially in physical contact with the user's skin and the user therefore feels the motion of the rotating asymmetric weights 1810. This being evident in cross-section 1800A whilst end-view 1800B shows the arcuate motion of the weights and that they are formed within an array through their use in conjunction with a GRD 1830 or through design. The connection between GRD 1830 and weights 1810 may be flexible or rigid. Optionally, the weights 1810 may be disposed in other configurations that may be square, circular, elliptical, polygonal, irregular etc. according to the desired location, fit, use of the ADDEV which may be as a wearable, a hand-held device, etc. Optionally, the number of weights 1810 may be other that shown and be 2, 3, 5, 8 or 10 for example.

Within the preceding description it would be evident that the physical separation of the motive means from the mechanical actuator, depicted within the embodiments of the invention supra in respect of FIGS. 5 to 17 as vibratory or pressure in FIG. 18 allows for placement of ADDEVs with configurations that are novel and support the integration of these within clothing, apparel, etc. for wearable devices as well as their use discretely as a wearable device and as an adult device in isolation from any clothing, apparel, etc. For example, a motor is no longer required at the vibrating element stimulating a user's clitoris so that the motor may be vaginally or anally inserted as part of the overall ADDEV or that it is elsewhere on the user's body such that the external appearance even with close fitting clothing is not visible to another user.

Figure 19:
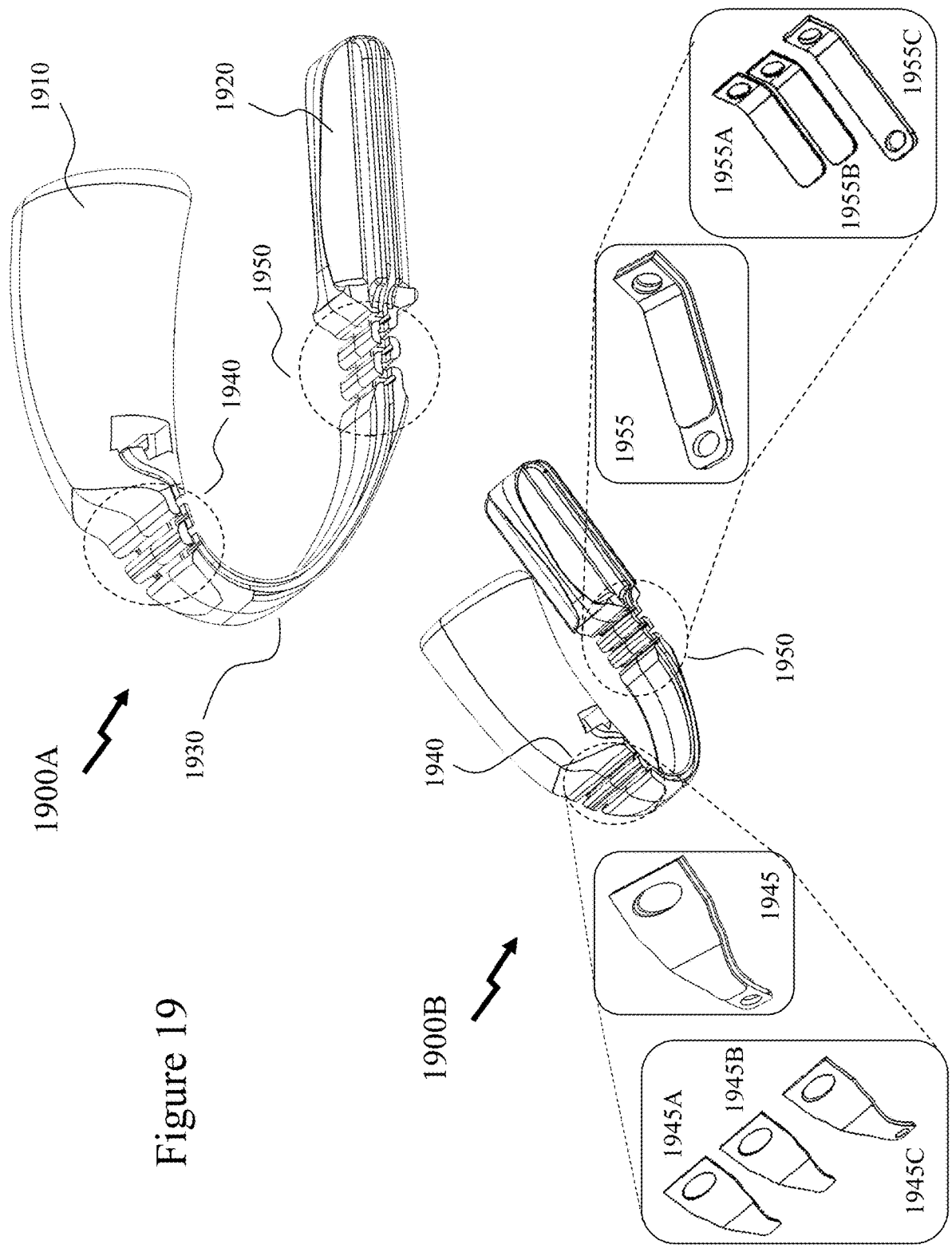
FIG. 19 depicts an ADDEV exploiting malleable/deformable sections to allow the user to adjust the fit of the ADDEV according to an embodiment of the invention.

Now referring to FIG. 19 there is depicted an ADDEV in first and second images 1900A and 1900B. As depicted in first image 1900A the ADDEV comprises first and second actuators 1910 and 1920 that are connected to a scaffold stem 1930 via first and second joints 1940 and 1950. Within an embodiment of the invention the first and second joints 1940 and 1950 respectively may simply provide some "strain relief" allowing motion of the first and second actuators 1910 and 1920 relative to the scaffold stem 1930. This may be through the scaffold structures alone or through use of metal elements within the scaffold structures. Referring to second image 1900B the metallic elements, first and second elements 1945 and 1955 respectively, within the first and second joints 1940 and 1950 respectively. As depicted the first element 1945 is composed of first to third piece-parts 1945A to 1945C whilst second element 1955 is composed of fourth to sixth piece-parts 1955A to 1955B. In first element 1945 the first and second piece-parts 1945A and 1945B are assembled either side of the third piece-part element 1945C. In second element 1955 the fourth and fifth piece-parts 1955A and 1955B are assembled either side of the sixth piece-part element 1955C.

Dependent upon the properties of the first and second elements 1945 and 1955 then the first and second joints 1940 and 1950 respectively may be flexible to absorb a range of variations in user physiology. Alternatively, they may be flexible within a predetermined range and malleable over a second larger range such that the user may make an adjustment in the geometry of the ADDEV that is maintained until the user re-adjusts these regions of the ADDEV. Whilst the first and second elements 1945 and 1955 are depicted with a pair of thinner outer sheets and a thicker inner sheet it would be evident that their design may be a single piece-part, a pair of piece-parts, four piece-parts etc. or multiple piece-parts laterally defined within the joint. These piece-parts may be of the same geometry, different geometry, anchored to the scaffold, unanchored to the scaffold, same material, different materials, assembled prior to integration/assembly of the ADDEV or assembled during assembly of the ADDEV. Optionally, the required characteristics of the joints are defined primarily through the elements with the plastic scaffold/casing providing mechanical protection to the user in the event of shattering/breaking of the elements or the overall mechanical performance may be derived from a combination of the elements and the scaffold/casing. Whilst the piece-part(s) forming the element(s) will typically be metallic due to the desired properties of malleability, strength, etc. it would be evident that other materials including, but not limited, to fiber reinforced composites, fiber reinforced plastic(s), and plastic(s) may be employed. Designs may be intended to lower cost/single use etc. and hence require reduced lifetime/use of the joints to shape/adjust the ADDEV.

Whilst the ADDEV depicted is a clitoral/G-spot ADDEV it would be evident that the methodology may be applied to other ADDEVs without departing from the scope of the invention. The inventors have established such malleable metal elements and observed that those formed from multiple layers of metal last longer than a single solid layer. Optionally, the lateral geometry/cross-section can be varied so that the region where the ADDEV bends/flexes is more defined. For example, the elements may be wider in the middle so that the elements will have the tendency to bend in the middle over a wide area. An example of a suitable metal being annealed stainless steel 304. The holes evident in some piece-parts, but optionally present in all, are provided such that when the scaffold is over molded the plastic scaffold material will fill the hole and lock the elements into position in each end of the plastic. This also limits element creep during repeated adjustments.

Figure 20:
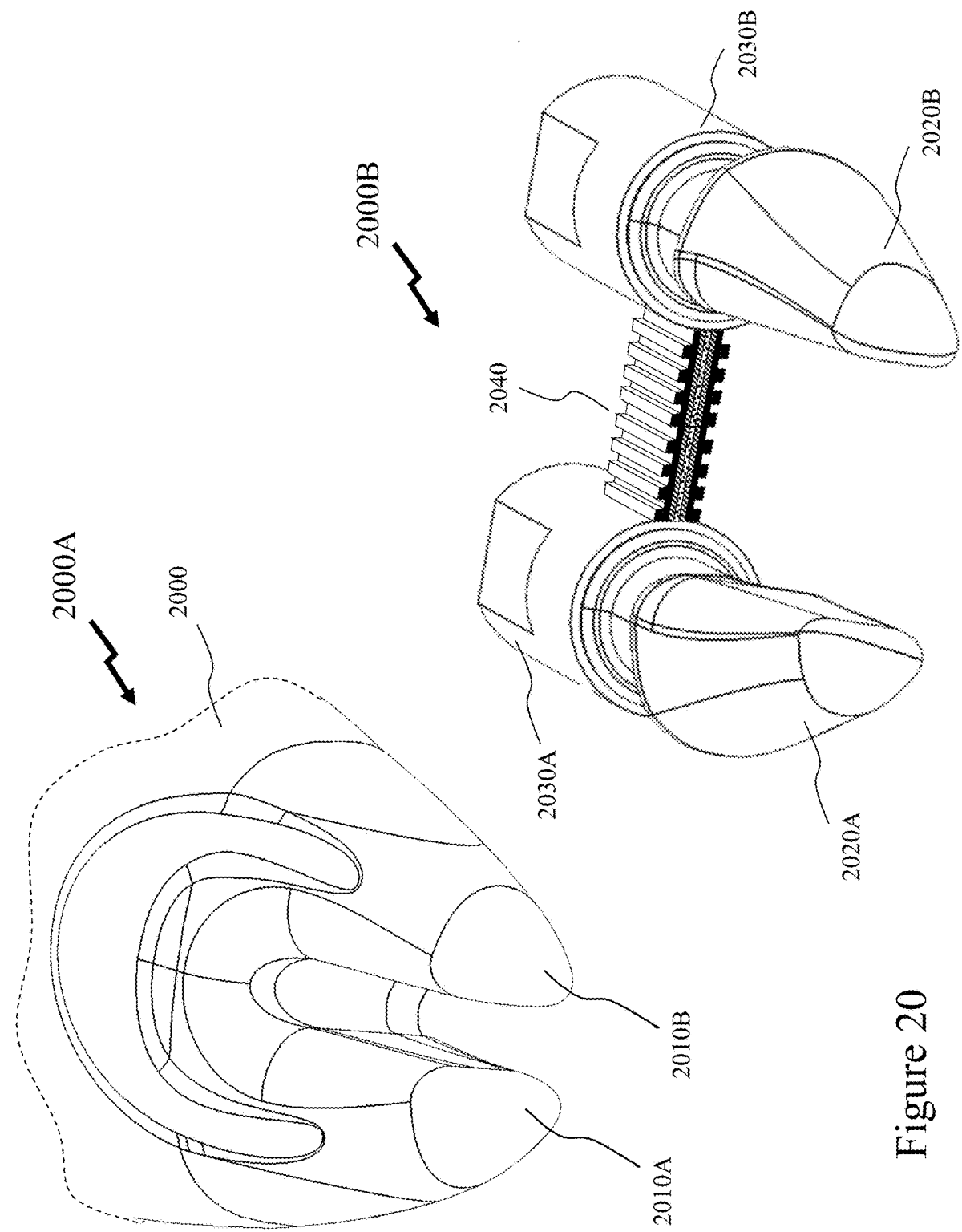
FIG. 20 depicts an ADDEV exploiting malleable/deformable sections to allow the user to adjust the fit of the ADDEV according to an embodiment of the invention.

This concept may be extended such as depicted in FIG. 20 with first and second images 2000A and 2000B for an ADDEV. As depicted in first image 2000A the ADDEV comprises a main body 2000 from which two "fingers" 2010A/2010B project allowing for example the ADDEV to provide stimulation to either side of a region of a user's body such as nipple, clitoris, penis etc. Referring to second image 2000B the majority of the ADDEV has been removed resulting in depiction of the pair of motors 2030A/2030B and the finger scaffolds 2020A/2020B which vibrate under the action of the pair of motors 2030A/2030B. As depicted these assemblies are attached by a link 2040 and surrounded in the final ADDEV with a silicone casing. Accordingly, the user may manipulate the assemblies relative to one another by bending the link 2040 thereby adjusting the separation of the "fingers" 2010A/2010B in a manner allowing this to be reversed or made even more pronounced. Optionally, the silicone casing may be "corrugated" to support its flexing with the link 2040 and "fingers" 2010A/2010B without creasing.

Figure 21:
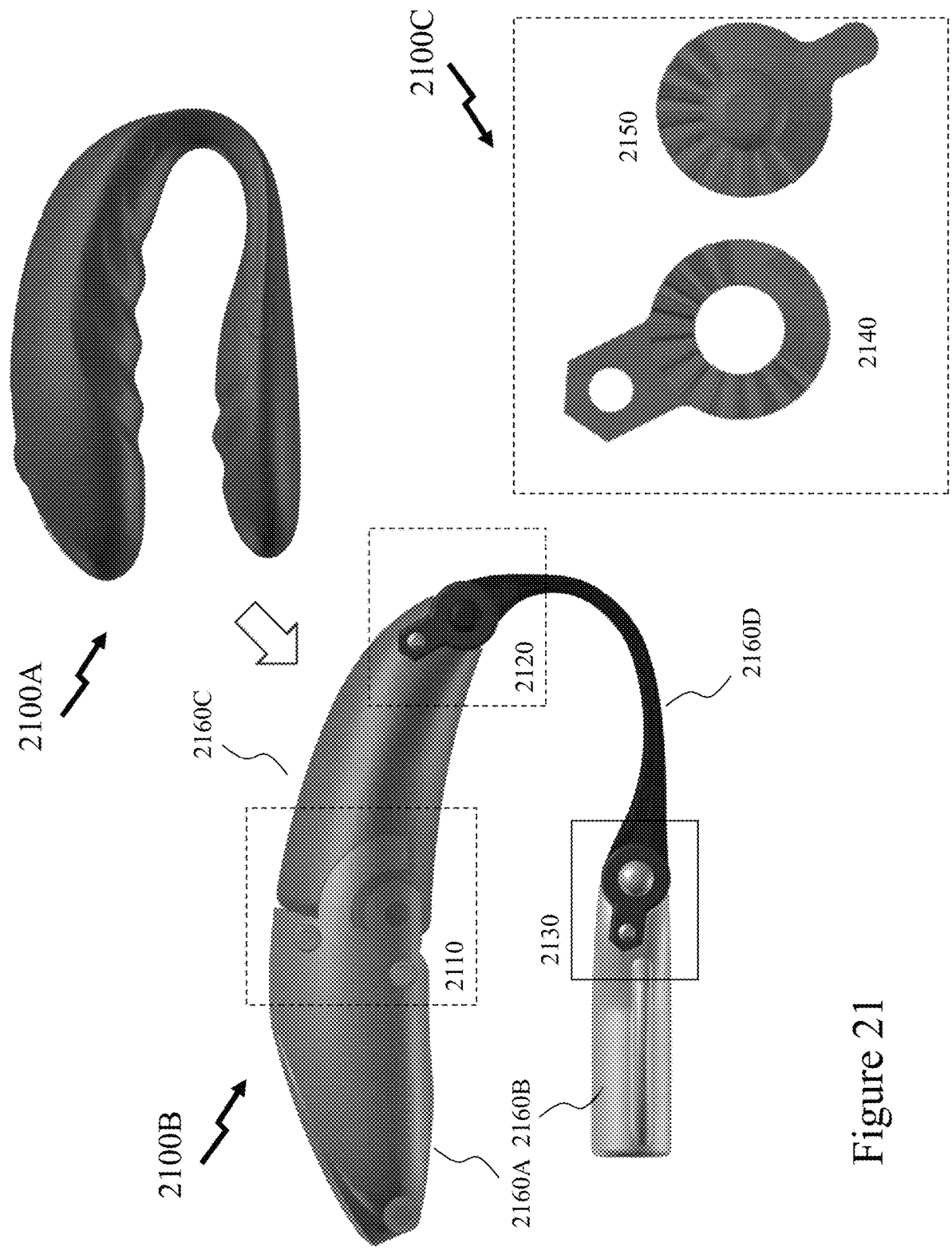
FIG. 21 depicts an ADDEV exploiting interlocking sections to allow the user to adjust the fit of the ADDEV according to an embodiment of the invention but in discrete steps rather than continuously.

Now referring to FIG. 21 there is depicted another means of allowing a user to adjust the orientation/configuration of an ADDEV according to an embodiment of the invention wherein an ADDEV is depicted in finished image 2100A and uncoated image 2100B formats. Whilst the ADDEV depicted is a clitoral/G-spot ADDEV it would be evident that the methodology may be applied to other ADDEVs without departing from the scope of the invention. With the silicone casing removed it is evident from uncoated image 2100B that the ADDEV comprises four elements 2160A to 2160D respectively forming, first vibratory actuator, second vibratory actuator, link, and housing respectively. As depicted these are joined together at three joints 2110 to 2130 respectively. First joint 2110 is a frictional joint between first vibratory actuator and housing such that the rear portion of the first vibratory actuator pivots relative to the housing and is frictionally retained in position such that movement is possible under normal use. In contrast second and third joints 2120 and 2130 are designed to maintain position under normal use but allow the user to adjust their position if sufficient force is applied. As depicted each of the second and third joints 2120 and 2130 comprises a first element 2140 attached to one of the pair of parts being joined and second element 2150 attached to the other of the pair of parts being joined. With the profiled surfaces facing one another the structures mesh together to maintain the relative angular orientation until sufficient pressure/force is applied to one or both of the joined parts that they can be moved relative to one another overcoming the friction/surface engagement and allowing therefore the angular orientation to be adjusted. It would be evident that rather than continuous adjustment this methodology provides for discrete angular adjustments, e.g. 15°, 20°, 30° etc. according to the number of features provided. Further the depth/profile of the features may be adjusted to vary the required force/pressure to adjust the joint.

It would be evident that other means of adjusting the device configuration may be employed in a continuous or discrete manner. Whilst the approaches presented relate primarily to reconfiguring the geometry of an ADDEV without adjusting its overall length, for example, other approaches may provide for adjustment of length/width such as telescoping scaffolds/drive shafts etc.

Within embodiments of the invention a motor assembly may be fitted to an item of apparel and the actuators fitted to the same item of apparel or another item of apparel. The flexible drive shaft(s) interconnecting these may similarly be within the same item of apparel, within the same item of apparel as either the motor assembly or the actuators, or within another item of apparel. In order to support ease of use and donning/removal of the item(s) of apparel the flexible drive shaft may be coupled/decoupled from the motor assembly and/or actuator(s). It would be evident that a variety of coupling mechanisms as known in the art may be employed.

Whilst within the preceding Figures the body of the insertable portion has not been described or depicted in detail these may be similar to one or more prior art dildos and/or vibrators and other ADDEVs. The outer surface of the insertable portion of the adult device may be smooth, contoured, grooved, ribbed, and/or comprise bumps and/or nubbies. Optionally, the contours may extend further across the upper surface of the ADDEV or they may be more centrally limited. Optionally, the depth, spacing, and number of grooves may vary as well as their surface profile from symmetric to asymmetric etc. Optionally, the upper surface may be smooth or it may be profiled by the distribution of nubbies across upper surface regions in some embodiments of the invention. Within others features that have multiple "fingers" or "fronds" may be employed to provide different sensations. Optionally different regions of the ADDEV may have different structures such as nubbies, grooves, smooth areas etc. on the upper central bump as well as its sides.

The ADDEV may be provided in a range of physical sizes such that, for example, the length of an inserted vaginal portion may be 65 mm, 75 mm, 100 mm, 125 mm, 150 mm, or 200 mm for example (2.5", 3", 4", 5", 6" or 8") and its lateral dimensions may be, for example, 15 mm, 25 mm, 35 mm, 40 mm, 50 mm, or 75 mm (0.6", 1", 1.4", 1.6", 2", or 3"). Similarly, lengths between vaginal and clitoral elements or vaginal and anal elements may be provided in different dimensions. Where an anal insertion element is provided its length and lateral dimensions may be over a similar range as the vaginally inserted portion. Whilst typically the vaginally inserted portion will have limited width variations along its length an anally inserted portion may have larger width variations and may have a length/width ratio lower than the vaginally inserted portion. However, other dimensions, aspect ratios, cross-section geometries etc. may be employed without departing from the scope of the invention. In embodiments of the invention supporting an ADDEV with separate motor element for placement elsewhere on the user's body and/or apparel this intermediate flexible drive shaft may be 75 mm, 100 mm, 125 mm, 150 mm, 200 mm, or 300 mm for example (3", 4", 5", 6", 8", or 12") and its lateral dimensions may be, for example, 2.5 mm, 5 mm, 7.5 mm, or 10 mm (0.1", 0.2", 0.3", or 0.4").

Optionally, the flexible drive shaft may be detachable from the motor and/or actuator elements allowing different lengths of drive shaft to be used with common motor/actuator pair. Optionally, this may also improve the user's ability to put on or take off an item of apparel or to combine wearable ADDEVs within their clothing with a motor assembly fitting into a pocket of their apparel, forming part of another item of apparel (e.g. belt, pouch, etc.)

Typically, the construction of an ADDEV such as depicted within embodiments of the invention described in respect of FIGS. 5 to 18 will employ one or more central scaffolds which provides rigidity to the required portions of the ADDEV which may be surrounded by a shell and then a casing. Whilst the casing and shell may be transparent or semi-transparent over portions or all of the ADDEV it is common for the ADDEV to be opaque. An outer casing may be coloured based upon skin colour tones based upon ethnicity or personal preference, e.g. Caucasian, Negroid, Mongol, light, dark, etc. as well as single colour, binary colour, multiple colour etc. According to the complexity acceptable then the outer casing may be formed from a variety of colours and/or be patterned for a specific design. Typically, such colours will be part of a silicone or other elastomer employed in forming the casing although in other embodiments of the invention the casing may be coloured once formed and a protective fluid proof, non-toxic, non-abrasive coating formed atop these applied colours. Such instances of applied colours may include metallic lacquers, particulate lacquers for "sparkle", etc. Exploitation of silicone coatings for the flexible drive shaft allows similar options although pigmenting of a wide variety of plastics employed in cables etc. may also be employed for outer casings of flexible drive shafts formed from other plastics and/or elastomers.

Optionally, the silicone may be clear and either embedded into the silicone or a shell of the ADDEV are LEDs, such as multi-colour LEDs for example, allowing the colour of the ADDEV to be varied either statically or dynamically, such as for example in response to commands from an associated PED generated in response to controlling ambient light, music, audiovisual content etc. Beneficially, medical grade silicone is clear thereby removing the requirement for any additional coating (e.g. food grade urethane) in conjunction with pigmented silicones. Accordingly, an ADDEV may with medical grade silicone be clear and formed from an initial sticky soft silicone, e.g. 20 durometer, with a microlayer (spray coated for example) of high durometer medical grade silicone, for example 70-90 durometer, to create "slippery" surface and avoid silky smooth surface that typically requires use of urethane coating.

Typically, the casing for the ADDEV will be formed from a non-toxic, hypoallergenic silicone to provide a safe smooth surface although some regions of the ADDEV may be coated, textured and/or finished with a variation from that of the remainder of the casing in order to enhance or promote retention of the ADDEV against the user's skin or clothing. Typically, the outer surface of the casing will be formed to provide low friction as well as resistance to lubricants that may or may not be employed.

Typically, within the outer silicone or elastomeric casing is a shell that houses internally, in the embodiments presented, vibratory motors, battery, control circuit and charging port. Within embodiments of the invention other functional elements may be employed for generating physical stimulus, providing user interface, wireless transceiver for communicating to an associated electronic device (PED or FED) or other ADDEV, etc. Within the description of embodiments of the invention and associated figures such elements are not presented for clarity of description, figures etc. However, such elements may or may not be implemented within embodiments of the invention. Accordingly, the shell may comprise a single chamber or a plurality of chambers and may be formed from one-piece part or multiple piece parts which are connected via the casing and/or discrete or connected by a central portion with different degrees of rigidity range from solid to a living hinge.

Optionally, the ADDEV may employ one, two, three or more motors as well as actuators of one, two or more different technical approaches. For example, one or more vibratory motors may provide high end vibrations whilst one or more vibratory or high impact gear-reduced motors may provide a low frequency "rumble" from larger weighted motors or through controlled frequency offset "throbbing." Optionally, linear vibratory motors may be disposed within the regions on the outer surface of the recipient's body or the inserted portion(s) whilst generally rotating asymmetric weight motors are within the shell of the inserted portion(s). Optionally, the outer surface of the ADDEV may provide electrical stimulation contacts through metal contacts or conductive silicone pads for example at predetermined locations on the inserted portion as well as the discussion supra in respect the clitoral region. Equally, contacts may be disposed on the lower outer portion of the ADDEV to engage the recipient's buttocks.

Embodiments of the invention with respect to controlling an ADDEV such as described within the embodiments of the invention supra in respect of FIGS. 5 to 18 may employ one or more methodologies as known within the art. Such control may be provided, for example, through a remote control wirelessly connected to the ADDEV, a PED or FED wirelessly connected to the ADDEV, a remote control wired to the ADDEV, and a control interface on the ADDEV allowing selection of predetermined program. In instances of wireless interfaced controllers, the control may be local, i.e. by a user engaged in a sexual activity involving the ADDEV, or the control may be remote.

Embodiments of the invention with respect to powering an ADDEV such as described within the embodiments of the invention supra in respect of FIGS. 5 to 21 may employ one or more methodologies as known within the art. For example, the ADDEV may comprise a rechargeable battery or batteries within the shell which may be of a standard form/type, such as AA, AAA, etc. or custom to the ADDEV and/or another product. Alternatively, the ADDEV may employ non-rechargeable batteries and require an access to allow in insertion/removal of the battery or batteries or the ADDEV may be disposed of once the batteries have been exhausted. Optionally, the ADDEV may be powered directly from electrical mains supply through a transformer to support extended use or high power requirements not supportable by realistic battery configurations allowing extended use. Where an electrical connection is made to the ADDEV this may be similarly via a technique known in the prior art such as plug-socket connection, magnetic electrical connectors, etc.

Whilst the ADDEV has been primarily described with respect to an ADDEV for use in providing stimulation to a female user vaginally/clitorally it would be evident that embodiments of the invention may also be employed providing stimulation of the external vaginal area, labia, perineum, nipples, breasts etc. as well as male perineum, testes, etc.

Embodiments of the invention with respect to the ADDEV such as described within the embodiments of the invention supra in respect of FIG. 16 may employ a wide flat, "sticky" surface for the outer surface engaging a recipient's body (e.g. being formed from a low durometer silicone for example) so that the surface is designed to "stick" to skin so it stays in place. This "sticky" surface may be mirror surface, matt or textured for grip. Examples of materials may be those with durometer ideal Shore A10 or lower, Shore A5 or lower, or Shore A1. In some embodiments of the invention a region or regions of the casing may be formed from a gel such as the Ecoflex™ platinum catalyzed silicones for example certified to ISI 10993-10 for skin irritation/sensitization and having, for example, Shore 00-50 hardness (below the Shore A scale), Shore 00-30 hardness, Shore 00-20 hardness, or Shore 00-10 hardness. Within embodiments of the invention the footprint of the casing may be significantly larger than the shell (mechanical assembly) footprint, larger than the shell print, approximately the same as the shell footprint, and smaller than the shell footprint. Where the shell footprint is larger than the shell footprint its mechanical structure may be such that it does not droop under its weight/gravity when held free, droops a small amount, droops a moderate amount, or droops completely according to the desired characteristics. In embodiments of the invention the casing around the shell may act like a thin sheet (<<1 mm thick), like a fabric or material, like a sheet (~1 mm), a thick sheet (>1 mm). Optionally, the lower surface of the casing designed for placement against a user's groin/stomach may be sticky and when washed recover this stickiness in its entirety or in different regions or areas.

Optionally, the outer surface which may contact the user may be smooth with low friction to human skin, smooth with minimal friction to human skin, smooth with moderate friction to human skin, smooth with high friction to human skin in its entirety or in different regions or areas. Alternatively, the surface may be smooth, textured, and/or rough and have low friction, negligible friction, moderate friction, and/or high friction in its entirety or in different regions or areas. Optionally, the surface may be textured with low friction to human skin, textured with minimal friction to human skin, textured with moderate friction to human skin, or textured with high friction to human skin in its entirety or in different regions. Optionally, the surface of the casing in its entirety or in different regions or areas may be used in conjunction with disposable sheets that provide adhesion and/or friction in predetermined levels.

Within embodiments of the invention the casing, for example formed from silicone, is the only material surrounding the casing and the surface profile is derived from applying the casing to the contoured surface of the shell. In other embodiments of the invention the surface profile is derived from multiple applications of a single material forming the casing. In other embodiments of the invention an additional material or materials are disposed between the shell and the casing. This, may for example, be a preform formed from the same material as the casing such that the casing is applied as a single or multiple dip coating for example, a preform formed from another silicone of different characteristics to the casing, a preform formed from a plastic, a preform formed from a low density foam, from a medium density foam, or a high density foam. Alternatively, a combination of materials may be employed such as two or more plastics, two or more foams, a foam and a plastic, a foam and a silicone, a form and metal. The materials may be layered, inserted, embedded, etc. without departing from the scope of the invention. However, a characteristic of these materials is the transmission of vibratory motion arising from the active elements within the ADDEV according to embodiments of the invention. Within passive embodiments this characteristic of material selection is removed.

Within the embodiments of the invention with active elements these are mounted to predetermined portions of the shell which is surrounded by the casing. Other embodiments may exploit a passive inserted portion mimicking a dildo function rather than a vibrator. As noted above the ADDEV according to embodiments of the invention may, in addition, to a silicone outer comprise one or more materials to provide mechanical structures such as ridges, shell, scaffold, etc. whilst the casing is smooth.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device for sexual stimulation comprising:
   a motor;
   a vibratory actuator;
   a flexible drive shaft connected to an output of the motor and providing motive power to the vibratory actuator; and
   at least one of a planetary gear set and a gear set to reduce the rotation rate of the flexible drive shaft by a predetermined amount; wherein
   the at least one is at least one of a predetermined portion of the vibratory actuator and disposed between the motor and vibratory actuator.

2. The device for sexual stimulation according to claim 1, wherein the flexible drive shaft is coupled to the vibratory actuator directly or via an intermediate drive means.

3. The device for sexual stimulation according to claim 1, wherein
   the vibratory actuator provides physical stimulation to a user at least one of continuously, periodically, and as an impulse.

4. The device for sexual stimulation according to claim 1, wherein
   the flexible drive shaft is within a bore of a flexible sheath; and
   the flexible sheath has disposed within the bore at least one of a liquid, a plurality of bushings maintaining the position of the flexible drive shaft within the bore, and a plurality of features on the inner surface of the bore to at least one of reduce frictional contact and maintain the position of the flexible shaft.

5. The device for sexual stimulation according to claim 1, wherein
   the vibratory actuator is one of a plurality of vibratory actuators;
   the flexible drive shaft is one of a plurality of drive shafts; wherein
   at least one of:
      the plurality of vibratory actuators are connected in series to the motor via the plurality of flexible drive shafts;
      the plurality of vibratory actuators are connected in parallel to the motor via the plurality of flexible drive shafts and an intermedia fan-out assembly to couple an input drive shaft to a number of other drive shafts; and a plurality of vibratory actuators are connected in a set of parallel assemblies each with a predetermined number of vibratory actuators and the set of parallel assemblies are coupled to the motor via an intermedia fan-out assembly to couple an input drive shaft to a number of other drive shafts.

6. The device for sexual stimulation according to claim 5, wherein the plurality of drive shafts are at least one of:
a combination of rigid and flexible drive shafts;
all flexible drive shafts; and
a plurality of connected rigid universal joints.

7. The device for sexual stimulation according to claim 1, wherein the vibratory actuator comprises:
a weight asymmetrically attached to the flexible drive shaft within a chamber formed within the device; and
supports for the flexible drive shaft at either end of the weight.

8. The device for sexual stimulation according to claim 7, further comprising a thrust bearing to terminate the flexible drive shaft, the thrust bearing being at least one of internal to the motor and external to the motor.

9. The device for sexual stimulation according to claim 1, wherein a portion of the device comprises a semi-rigid portion through which the flexible drive shaft passes comprising a plurality of elements joined through ball and socket joints.

10. The device for sexual stimulation according to claim 1, further comprising:

a body having generally tubular construction with a bore through the length of the body;
the flexible drive shaft is one of a plurality of flexible drive shafts;
the vibrator actuator is one of a plurality of vibratory actuators; wherein
subsets of the plurality of vibratory actuators are joined by a subset of the plurality of flexible drive shafts to form a set of parallel assemblies coupled to the motor.

11. The device for sexual stimulation according to claim 10, wherein the motor is at least one of:
a single motor coupled to the set of parallel assemblies through a series of couplings and a series of drive shafts are coupled to the motor; and
a plurality of motors each coupled to a parallel assembly of the set of parallel assemblies; and
a plurality of motors each coupled to a predetermined number of parallel assemblies of the set of parallel assemblies.

12. The device for sexual stimulation according to claim 10, wherein at least one of:
body and bore are dimensioned with respect to a human penis;

at least one of a predetermined portion of the bore and a predetermined portion of the outer surface has disposed upon it a plurality of features; and
the body is flexible such the device can be turned inside out.

13. The device for sexual stimulation according to claim 1, wherein the motor and vibratory actuator are either fitted to different regions of an item of apparel or fitted to different items of apparel.

14. The device for sexual stimulation according to claim 13, wherein the flexible drive shaft is at least one of fitted within the same item of apparel as the motor, fitted within the same item of apparel as the vibratory actuator, fitted to a surface of an item of apparel other than that associated with the vibratory actuator or motor, and forms part of a decoration of an item of apparel.

15. The device for sexual stimulation according to claim 1, wherein the vibratory actuator comprises:
first and second supports disposed at predetermined positions along the flexible drive shaft; and
a weight asymmetrically attached at a predetermined location on the drive shaft between the first and second supports.

16. The device for sexual stimulation according to claim 15, further comprising;

at least one of:
a thrust bearing disposed at the other end of the drive shaft to terminate the drive shaft;
a coupling at the end of the drive shaft for connecting the drive shaft to a flexible drive shaft;
a coupling at the other end of the drive shaft for connecting the drive shaft to a flexible drive shaft; and
an outer casing defining a chamber around the drive shaft, first and second supports, and weight.

17. The device for sexual stimulation according to claim 15, wherein the first and second supports are bearings.

18. A device for sexual stimulation comprising:
a motor;
a vibratory actuator; and
a flexible drive shaft connected to an output of the motor and providing motive power to the vibratory actuator; wherein
the motor and vibratory actuator are either fitted to different regions of an item of apparel or fitted to different items of apparel.

19. The device for sexual stimulation according to claim 18, wherein the flexible drive shaft is at least one of fitted within the same item of apparel as the motor, fitted within the same item of apparel as the vibratory actuator, fitted to a surface of an item of apparel other than that associated with the vibratory actuator or motor, and forms part of a decoration of an item of apparel.

* * * * *